(12) United States Patent
Klein et al.

(10) Patent No.: US 11,137,073 B2
(45) Date of Patent: Oct. 5, 2021

(54) PARK LOCK FOR AN AUTOMATIC TRANSMISSION IN A MOTOR VEHICLE

(71) Applicant: ZF Friedrichshafen AG, Friedrichshafen (DE)

(72) Inventors: Julia Klein, Friedrichshafen (DE); Matthias List, Friedrichshafen (DE); Tobias Miller, Waldburg (DE); Franz Brugger, Friedrichshafen (DE); Bernd Austermann, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/622,060

(22) PCT Filed: May 9, 2018

(86) PCT No.: PCT/EP2018/061957
§ 371 (c)(1),
(2) Date: Dec. 12, 2019

(87) PCT Pub. No.: WO2018/228753
PCT Pub. Date: Dec. 20, 2018

(65) Prior Publication Data
US 2020/0182353 A1 Jun. 11, 2020

(30) Foreign Application Priority Data
Jun. 14, 2017 (DE) .................. 10 2017 210 068.0

(51) Int. Cl.
*F16H 63/34* (2006.01)
*B60T 1/00* (2006.01)
(52) U.S. Cl.
CPC .......... *F16H 63/3433* (2013.01); *B60T 1/005* (2013.01); *F16H 63/3475* (2013.01); *F16H 63/3483* (2013.01)

(58) Field of Classification Search
CPC ................ F16H 63/3416–3491; B60T 1/005
See application file for complete search history.

(56) References Cited

U.S. PATENT DOCUMENTS 5,630,339 A * 5/1997 Tuday .................... B60T 1/005
192/219.5
7,506,737 B2 * 3/2009 Okanishi ................ B63H 23/08
192/13 A (Continued)

FOREIGN PATENT DOCUMENTS

DE  102008011115 A1  8/2009
DE  102009023498 A1  12/2010

(Continued)

OTHER PUBLICATIONS

German Search Report DE102017210068.0, dated Mar. 1, 2018 (14 pages).

(Continued)

*Primary Examiner* — Ernesto A Suarez
*Assistant Examiner* — James J Taylor, II
(74) *Attorney, Agent, or Firm* — Dority & Manning, P.A.

(57) ABSTRACT

A parking lock includes a locking pawl (2) and an interlocking element (7). The locking pawl (2) is pivotably mounted on a pawl pin (1) and engageable with a parking interlock gear (3). The interlocking element (7) is arranged on a connecting bar (4) to a selector disk (5), spring-loaded with a spring element (6), and clampable between the locking pawl (2) and a guiding plate (8). An end of the connecting bar (4) facing away from the interlocking element (7) is articulatedly connected to the selector disk (5). An engaging piece (16) of the selector disk (5) is operatively connected to a parking lock actuator (12). The connecting bar (4) is arranged below the locking pawl (2) such that a motion plane of the connecting bar (4) is parallel to a motion (Continued)

plane of the locking pawl (2) and perpendicular to the pawl pin (1).

31 Claims, 33 Drawing Sheets

(56) References Cited

U.S. PATENT DOCUMENTS

| | | |
|---|---|---|
| 8,840,506 B2 | 9/2014 | Schwekutsch et al. |
| 8,844,703 B2 | 9/2014 | Jang et al. |
| 9,327,691 B2 | 5/2016 | List et al. |
| 2008/0220935 A1 | 9/2008 | Willeke et al. |

FOREIGN PATENT DOCUMENTS

| | | |
|---|---|---|
| DE | 102011057057 A1 | 1/2013 |
| DE | 102011084392 A1 | 4/2013 |
| DE | 102014225603 A1 | 6/2016 |
| DE | 102015200978 A1 | 7/2016 |
| WO | WO 2009/106238 | 9/2009 |

OTHER PUBLICATIONS

International Search Report PCT/EP2018/061957, dated Oct. 4, 2018. (7 pages).
International Preliminary Examination Report PCT/EP2018/061957, dated May 9, 2018. (22 pages).
Naunheimer, H. et al. Fahrzeuggetriebe (Vehicle Transmissions), 2. Auflage, Berlin Heidelberg : Springer-Verlag, 2007, Seiten: 368-373.—ISBN 978-3-540-30625-2.

* cited by examiner

PARK LOCK FOR AN AUTOMATIC TRANSMISSION IN A MOTOR VEHICLE

CROSS-REFERENCE TO RELATED APPLICATIONS

The present application is related and has right of priority to PCT Application No. PCT/EP2018/061957 filed on May 9, 2018 and published as WO 2018/228753. The present application is also related and has right of priority to German Patent Application No. 10 2017 210 068.0 filed on Jun. 14, 2017. Both of the above referenced applications are incorporated by reference, in their entirety, for all purposes.

FIELD OF THE INVENTION

The present invention relates generally to a parking lock for an automatic transmission for a motor vehicle.

BACKGROUND

Parking lock mechanisms for automatic transmissions are known from the prior art. These parking lock mechanisms include a locking pawl, which is pivotably mounted on a pawl pin and engages into or disengages from a parking interlock gear connected to the output shaft of the transmission, and an interlocking element arranged on a connecting bar to a selector disk mounted on a pin. In the interlocked condition, the interlocking element is clamped between the locking pawl and a guiding plate in order to prevent the locking pawl from being forced out from a tooth space of the parking interlock gear. In this case, the interlocking element is spring-loaded on connecting bar with the aid of a spring element. The end of the connecting bar facing away from the interlocking element is articulatedly connected to the selector disk, which is operatively connected to a piston rod of a hydraulically actuatable parking lock piston, which is arranged in a parking lock cylinder and is axially displaceable counter to the force of an engaging spring element designed as a torsion spring, in order to disengage the parking lock, and with the aid of the force of the engaging spring element in order to engage the parking lock.

In order to disengage the parking lock, the cylinder chamber of the parking lock cylinder is pressurized and pushes the parking lock piston and, therefore, the selector disk counter to the spring force of the torsion spring into the "P_aus" (parking lock disengaged) position. In this case, a solenoid valve is energized, in order to additionally interlock the parking lock piston of the parking lock cylinder.

In order to engage the parking lock, the solenoid valve is de-energized, wherein the cylinder chamber of the parking lock cylinder is vented and the mechanical interlock of the parking lock piston is released. Due to the preloaded torsion spring on the selector disk, the selector disk and, therefore, the parking lock piston are brought into the "P_ein" (parking lock engaged) position. In so doing, the interlocking element, which is generally designed as a locking cone, is displaced on the guiding plate under the locking pawl and then acts on the locking pawl in such a way that a tooth of this locking pawl can engage into a corresponding tooth space of the locking toothing of the parking interlock gear. In a tooth-on-tooth position, the spring element, with the aid of which the interlocking element is spring-loaded on the connecting bar, is preloaded, and so, as soon as a tooth of the locking pawl hits a tooth space, the locking pawl engages into the locking toothing of the parking interlock gear.

DE 10 2009 023 498 B4 describes a parking lock arrangement for a motor vehicle including at least one electrically driven drive axle, including a parking interlock gear on a shaft, which is drivable by an electric machine, a parking lock actuator including a push rod, which, in order to engage the parking lock, acts with the aid of a locking cone counter to the disengagement force of a torsion spring surrounding a pawl pin and is arranged axially parallel to the parking pawl and perpendicular to the pawl pin, an interlock sensor for detecting the engagement position of the parking pawl, an input unit for detecting an engagement command for engaging the parking lock, a ground speed sensor for detecting the present motor vehicle speed below a predefined threshold, below which an engagement of the parking lock is permissible, and an electronic control unit, which can control the parking lock actuator as well as the electric machine. The electronic control unit actuates the parking lock actuator for engagement only if the motor vehicle speed has not exceeded a predefined threshold. In this case, the electronic control unit actuates the electric machine to apply a torque to the shaft connected to the parking interlock gear if, despite the actuation of the parking lock to disengage the parking pawl, the interlock sensor detects that the parking pawl is still engaged, so that the electric machine stress-relieves the drive train counter to a preload direction and the ratchet tooth can pivot out of the interlock profile of the parking interlock gear.

DE 10 2011 084 392 A1 describes a transmission parking lock, including an actuating rod, which is displaceable in an essentially translatory manner and supports an actuating element, and including an essentially rotationally displaceable pawl, which supports an interlocking element. In order to engage the transmission parking lock via displacement of the actuating rod, the pawl is pivotable out of an inoperative position into an interlock position thereof in such a way that the interlocking element engages into a recess of a gearwheel associated with a transmission shaft. The transmission parking lock also includes a device, which lifts the actuating element of the actuating rod, in the inoperative position thereof, off the pawl. In this case, the actuating rod is arranged essentially perpendicular to a pawl pin. The pawl is arranged so as to be pivotable about the pawl pin.

Moreover, DE 10 2014 225 603 A1 describes an arrangement for the mechanical and hydraulic actuation of a transmission parking lock unit, including a parking lock actuator arranged on a housing, which is hydraulically actuated in order to disengage a parking lock, a hydraulic piston displaceably arranged in a housing-affixed cylinder, a piston rod, which is connected to the hydraulic piston and is operatively connected to a push rod acting on the parking pawl, and a compression spring surrounding the piston rod, which is axially tensioned between the cylinder and a sleeve enclosing the piston rod and movable in the direction of the central axis of the piston rod. In this case, the spring force of the compression spring effectuates an engagement of the parking lock if the parking lock actuator is switched to a non-pressurized condition, wherein the push rod is connected to the sleeve with the aid of a transversal bore in the sleeve and to the piston rod with the aid of an oblong hole in the piston rod so as to be pivotable essentially at a right angle to the central axis of the piston rod, in such a way that the axial extension of the oblong hole delimits the axial path of the sleeve and the push rod. During engagement of the parking lock, the push rod is axially displaced by the compression spring with the aid of the compression spring and, during disengagement of the parking lock, the push rod is displaced in the oblong hole in the axial direction by the pressurized piston with the aid of the piston rod and the stop facing away from the hydraulic piston. The sleeve is also displaceable via an emergency release in the direction toward the disengagement of the parking lock, without being connected to the piston rod in a force-locking manner.

SUMMARY OF THE INVENTION

Example aspects of the present invention provide a parking lock for an automatic transmission in a motor vehicle, which is compactly designed and requires little installation space. Moreover, a method for installing an engaging piece of the selector disk into a parking lock piston of a parking lock according to an advantageous example embodiment of the invention is provided.

According thereto, a parking lock for an automatic transmission in a motor vehicle is provided. The parking lock includes a locking pawl, which is pivotably mounted on a pawl pin and engages into or disengages from a parking interlock gear connected to the output shaft of the automatic transmission, and an interlocking element, which is arranged on a connecting bar to a selector disk. In the engaged—i.e., interlocked—condition of the parking lock, the interlocking element is clamped between the locking pawl and a guiding plate in order to prevent the locking pawl from being forced out from a tooth space of the parking interlock gear. The interlocking element is spring-loaded on the connecting bar with the aid of a spring element. The end of the connecting bar facing away from the interlocking element is articulatedly connected to the selector disk. The selector disk is operatively connected to a parking lock actuator in such a way that a disengagement of the parking lock takes place with the aid of an actuation force of the parking lock actuator directed counter to the force of an engaging spring element. An engagement of the parking lock takes place with the aid of the force of the engaging spring element. In this case, the connecting bar is arranged below the locking pawl in such a way that the plane of motion of the connecting bar is essentially parallel to the plane of motion of the locking pawl and essentially perpendicular to the pawl pin, and wherein the selector disk is rotatably mounted on the pawl pin.

In certain example embodiments, the parking lock actuator is a hydraulically actuatable piston/cylinder unit. Correspondingly, the parking lock actuator includes a hydraulically actuatable parking lock piston, which is axially displaceable in a control housing and is operatively connected to an engaging piece of the selector disk.

According to an example embodiment of such a hydraulically actuatable parking lock actuator, the hydraulically actuatable parking lock piston, to which the selector disk is operatively connected, is arranged essentially in parallel to the connecting bar, below the connecting bar as viewed spatially. Preferably, the pawl pin is arranged under the parking interlock gear in this case.

According to another example embodiment of such a hydraulically actuatable parking lock actuator, the control housing and the parking lock piston each include a recess, through which an engaging piece, which is rotationally fixed to the selector disk or integrally formed with the selector disk, is guided in order to establish an operative connection between the selector disk and the parking lock piston. Such a recess is preferably designed in the shape of a slot.

According to an advantageous example refinement, the engaging piece includes, in the actuation area, a groove, which engages into a pin connected to the parking lock piston. The groove can be designed as a straight slot or kidney-shaped. The pin is arranged perpendicular to the longitudinal axis of the parking lock piston. Due to this design, an impact between the engaging piece and areas of the parking lock piston due to the necessary installation clearance is prevented, which can result in indentations on the parking lock piston, since the parking lock piston is generally made of aluminum and the selector disk is generally made of steel.

In the case of a kidney-shaped groove, different functionalities can be achieved with the aid of the design of the tightness and type of the curvature of the groove (left-sided or right-sided), since the kidney-shaped groove is a type of curved path on which the pin travels. For example, the kidney-shaped groove can be designed in such a way that the kidney-shaped groove results in an axial path extension of the interlocking element and in a rapid disengagement of the parking lock, or in such a way that the parking lock piston is subjected to no or only very slight transverse forces in the two end positions of the parking lock piston, i.e., in the "parking lock engaged" and "parking lock disengaged" positions.

According to an example refinement of the invention, the engaging spring element is designed as a compression spring, which, viewed axially, surrounds the piston rod of the parking lock piston entirely or partially concentrically. Due to this design, the bearing base of the pawl pin bearing for supporting the pawl pin is reduced in size, whereby the force transmission into the transmission housing is optimized. Moreover, the engaging spring element designed as a compression spring has fewer losses due to friction than a torsion spring; in addition, greater actuating forces can be implemented with the aid of a compression spring.

In this case, the compression spring can be guided on sleeves in order to protect the piston rod against damage. One sleeve can rest, on the side facing the control housing, against the control housing, and the other sleeve is held, on the side facing away from the control housing, by a snap ring-type retainer, wherein the snap ring is radially secured against disengagement by this sleeve, in an advantageous way.

Alternatively, the retention of the compression spring on the side facing away from the control housing can take place with the aid of a nut or with the aid of a pin or with the aid of one or more machine elements. Moreover, the sleeve provided on the side facing the control housing can be omitted, in that a stepped axial bore extending in the direction of the central axis of the piston rod or a circular groove extending around the central axis of the piston rod is provided in the control housing; the end of the compression spring facing the control housing is located in this stepped bore or in this groove in this case, and is kept away from the contact surface of the parking lock piston.

Within the scope of another example refinement of the invention, the engaging spring element is designed as a torsion spring, the coils of which are arranged around the pawl pin.

As an alternative example embodiment of the parking lock actuator, an electric servo-drive is provided, which is operatively connected to the selector disk. Such an electric servo-drive can include, for example, an electric motor and spindle drive drivable by this electric motor and acting on the selector disk. It is advantageous to design such a spindle drive as a self-locking gear arrangement, so that a separate device for retaining or holding the selector disk in one of the end positions or in both of the end positions can be omitted.

Moreover, the selector disk can include two legs, each of which includes a circular bore, wherein the bores are arranged coaxially to each other and are utilized for mounting the selector disk on the pawl pin, wherein the locking pawl is mounted between the two legs. Due to this design, friction effects are minimized in an advantageous way.

In the case of the parking lock mechanisms known from the prior art, the locking pawl is generally held down by a spring element, for example, by a torsion spring or a compression spring, when the parking lock is disengaged. Due to the fact that the locking pawl is held down, a swinging of the pawl and, consequently, a rattling of the locking pawl on the parking interlock gear are prevented. Disadvantageously, as a result, the engaging spring element and the spring element, with the aid of which the interlocking element is spring-loaded on the connecting bar, must be designed having greater dimensions, since they must overcompress the spring element for holding down, which requires a large amount of installation space. Moreover, according to the prior art, the spring element for holding down is supported on the pawl pin, whereby the bearing base of the pawl pin bearing must be designed having comparatively large dimensions for supporting the pawl pin, in order to be able to reliably support the pawl forces, which disadvantageously requires a large amount of installation space.

It is therefore provided, in a further example refinement of the invention, to provide a stop of the locking pawl on the selector disk in order to hold down the locking pawl in the disengaged condition. Due to the fact that the need for a spring element for holding down the locking pawl is omitted, the engaging spring element and the spring element, with the aid of which the interlocking element is spring-loaded on the connecting bar, can be designed having smaller dimensions in order to gain installation space. Moreover, the bearing base of the pawl pin bearing for supporting the pawl pin can be designed having smaller dimensions and can move closer to the locking pawl, whereby the support of the locking pawl is optimized. In the disengaged condition of the parking lock, the stop prevents the locking pawl from contacting the parking interlock gear, whereby a rattling of the locking pawl is prevented.

The stop on the selector disk can be formed by a recess, a caulking, by a hook or a nose, or by bolted-on machine elements, etc., whereas the stop surface of the pawl can be formed by a nose or a hook, by bolted-on machine elements, by crimping, caulking, etc.

In an example structural design of such a stop, a stop surface is provided as the stop of the selector disk, which cooperates with a corresponding stop surface of the locking pawl in such a way that a gap does not remain between these two stop surfaces in the disengaged condition of the parking lock.

In an advantageous example alternative thereto, a stop surface is provided as the stop of the selector disk, which cooperates with a corresponding stop surface of the locking pawl in such a way that a gap remains between these two stop surfaces in the disengaged condition of the parking lock. Due to this structural design, tolerances of the involved components can be compensated for in a simple way.

In an example refinement thereof, a spring element is arranged on one of the two stop surfaces or also on both stop surfaces, which is designed in such a way that the spring element assists or replaces the engaging spring element during the engagement of the parking lock.

In another advantageous example embodiment of the invention, a spring element is provided in order to hold down the locking pawl in the disengaged condition of the parking lock, which prevents the locking pawl from contacting the parking interlock gear in the disengaged condition of the parking lock.

In an example refinement thereof, this spring element is designed in such a way that the spring element assists or replaces the engaging spring element during the engagement of the parking lock.

In particular, such a spring element can be preloaded on the selector disk in such a way that a free end of this spring element comes into contact with the locking pawl in a force-locking manner only if the selector disk, originating from the position of the selector disk in the engaged condition of the parking lock, is turned by a predefined angle in the direction of its position in the disengaged condition of the parking lock, so that, for the case in which the free end of the spring element acts on the locking pawl in a force-locking manner, the force of the spring element acting on the locking pawl prevents contact between the locking pawl and the parking interlock gear. Alternatively, the spring element can be preloaded on the selector disk in such a way that the free end of the spring element is already in contact with the locking pawl in a force-locking manner if the selector disk is in the position of the selector disk in the engaged condition of the parking lock, so that, for the case in which the selector disk, originating from the position of the selector disk in the engaged condition of the parking lock, is turned in the direction of its position in the disengaged condition of the parking lock, the force of the spring element acting on the locking pawl is increased in such a way that contact between the locking pawl and the parking interlock gear is reliably prevented. Therefore, various possibilities are available for influencing the contact force path on the locking pawl in a targeted manner during swiveling motion of the locking pawl.

In a particularly advantageous example refinement of the invention, the locking pawl of the parking lock rests against the interlocking element of the parking lock in a force-locking manner in the statically engaged condition of the parking lock as well as in the statically disengaged condition of the parking lock. For this purpose, two functional surfaces are provided on the locking pawl, of which the first functional surface clamps the interlocking element between the locking pawl and the guiding plate, in a known way, in the engaged condition of the parking lock, whereas the second functional surface rests against a corresponding surface of the interlocking element in the disengaged condition of the parking lock. Due to this structural design of the locking pawl and the interlocking element, the situation is effectively prevented, in which the locking pawl can impact other elements of the parking lock mechanism, such as the connecting bar, due to dynamic effects during the disengagement of the parking lock and in the disengaged condition of the parking lock.

BRIEF DESCRIPTION OF THE DRAWINGS

Example aspects of invention are explained in greater detail in the following, by way of example, with reference to the attached figures. Wherein.

DETAILED DESCRIPTION

Figure 1A:
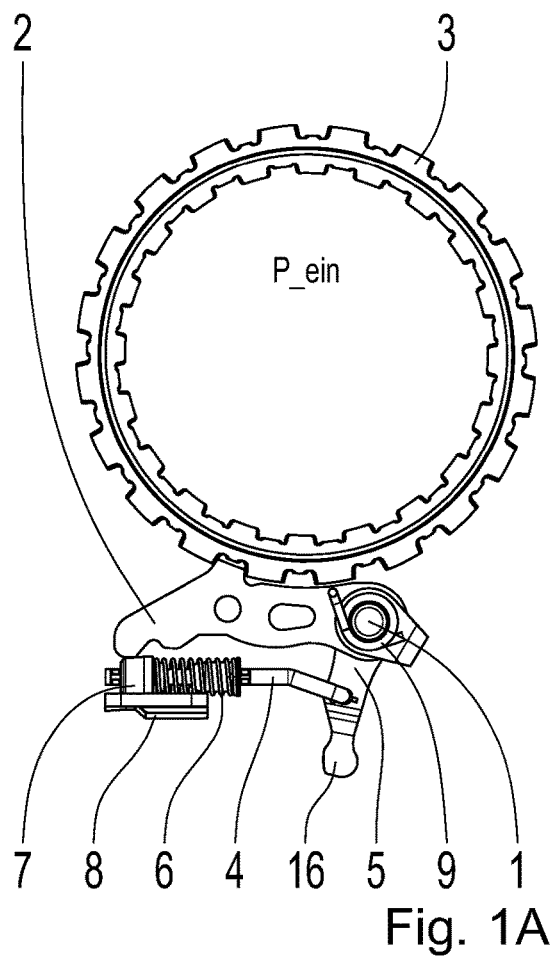
FIG. 1A shows a schematic of a first exemplary embodiment of a parking lock according to the invention in the "parking lock engaged" engagement position.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1B:
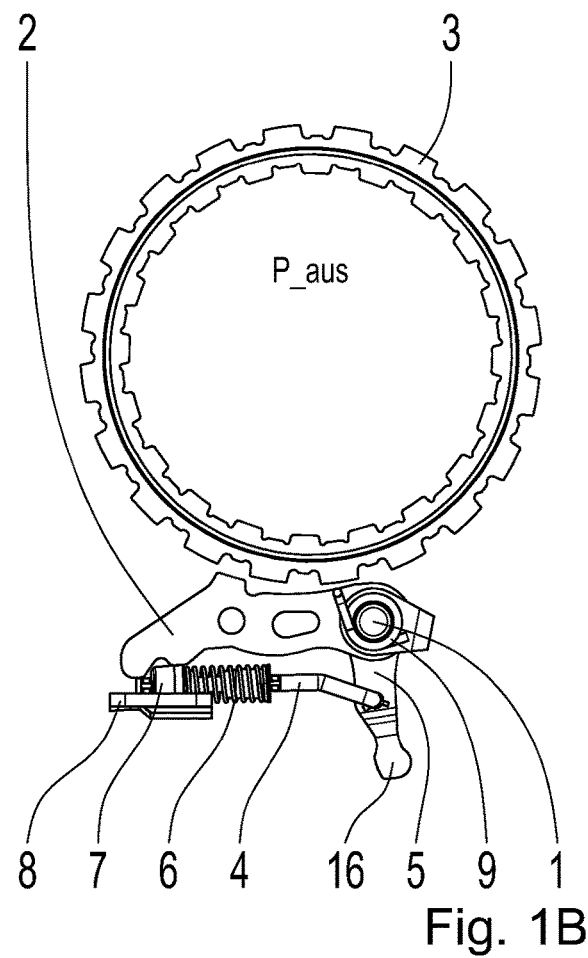
FIG. 1B shows the parking lock according to FIG. 1A in the "parking lock disengaged" engagement position.
Figure 1C:
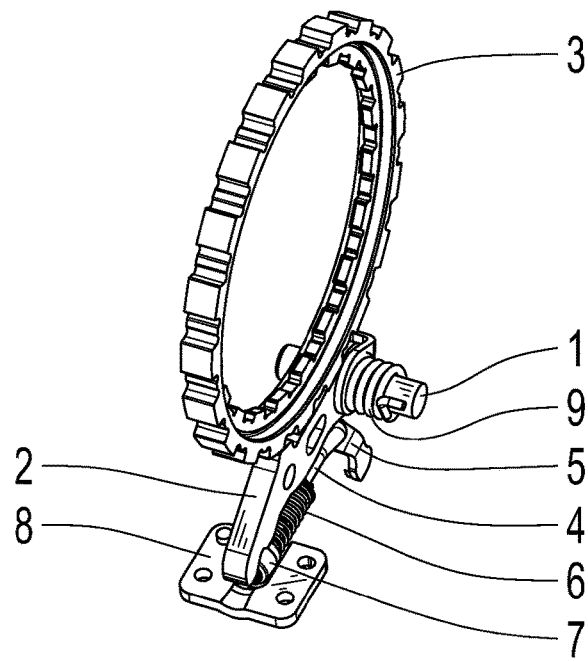
FIG. 1C shows a perspective representation of the parking lock according to FIG. 1A.

The parking lock shown in FIGS. 1A, 1B and 1C includes a locking pawl 2, which is pivotably mounted on a pawl pin 1 and engages into or disengages from a parking interlock gear 3 connected to the output shaft of the transmission. The parking lock also includes an interlocking element 7, which is arranged on a connecting bar 4 to a selector disk 5, is spring-loaded with the aid of a spring element 6, is designed as a locking cone and, in the interlocked condition, is clamped between the locking pawl 2 and a guiding plate 8 in order to prevent the locking pawl from being forced out from a tooth space of the parking interlock gear 3.

Figure 10:
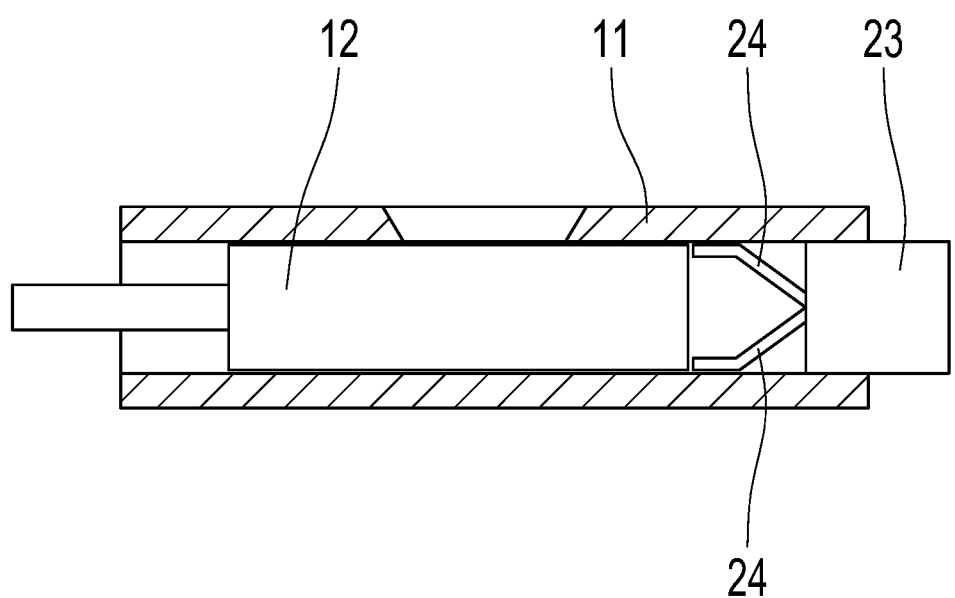
FIG. 10 shows a diagrammatic view of the second step for the assembly of the selector disk and the parking lock cylinder.

FIG. 1A shows the parking lock in the "parking lock engaged" engagement position, marked by the reference character P_ein. FIG. 1B, on the other hand, shows the parking lock in the "parking lock disengaged" engagement position, marked by the reference character P_aus. Finally, FIG. 10 shows the parking lock in a three-dimensional representation.

The end of the connecting bar 4 facing away from the interlocking element 7 is articulatedly connected to the selector disk 5, which is operatively connected to a parking lock actuator (not represented here), which actuates the selector disk 5 counter to the force of an engaging spring element 9 in order to disengage the parking lock. An engaging piece 16 of the selector disk 5 is utilized for absorbing the force exerted by the parking lock actuator during the disengagement of the parking lock. The engagement of the parking lock takes place with the aid of the force of the engaging spring element 9. According to example aspects of the invention, the connecting bar 4 is arranged below the locking pawl 2, in parallel to the locking pawl 2, and perpendicular to the pawl pin 1, wherein the selector disk 5 is rotatably mounted on the pawl pin 1.

In the first exemplary embodiment of a parking lock according to the invention shown in FIGS. 1A, 1B, and 1C, the engaging spring element 9 is designed as a torsion spring, the coils of which are arranged around the pawl pin 1. Moreover, in the example shown, a thrust washer is arranged between the selector disk 5 and the locking pawl 2.

Figure 1D:
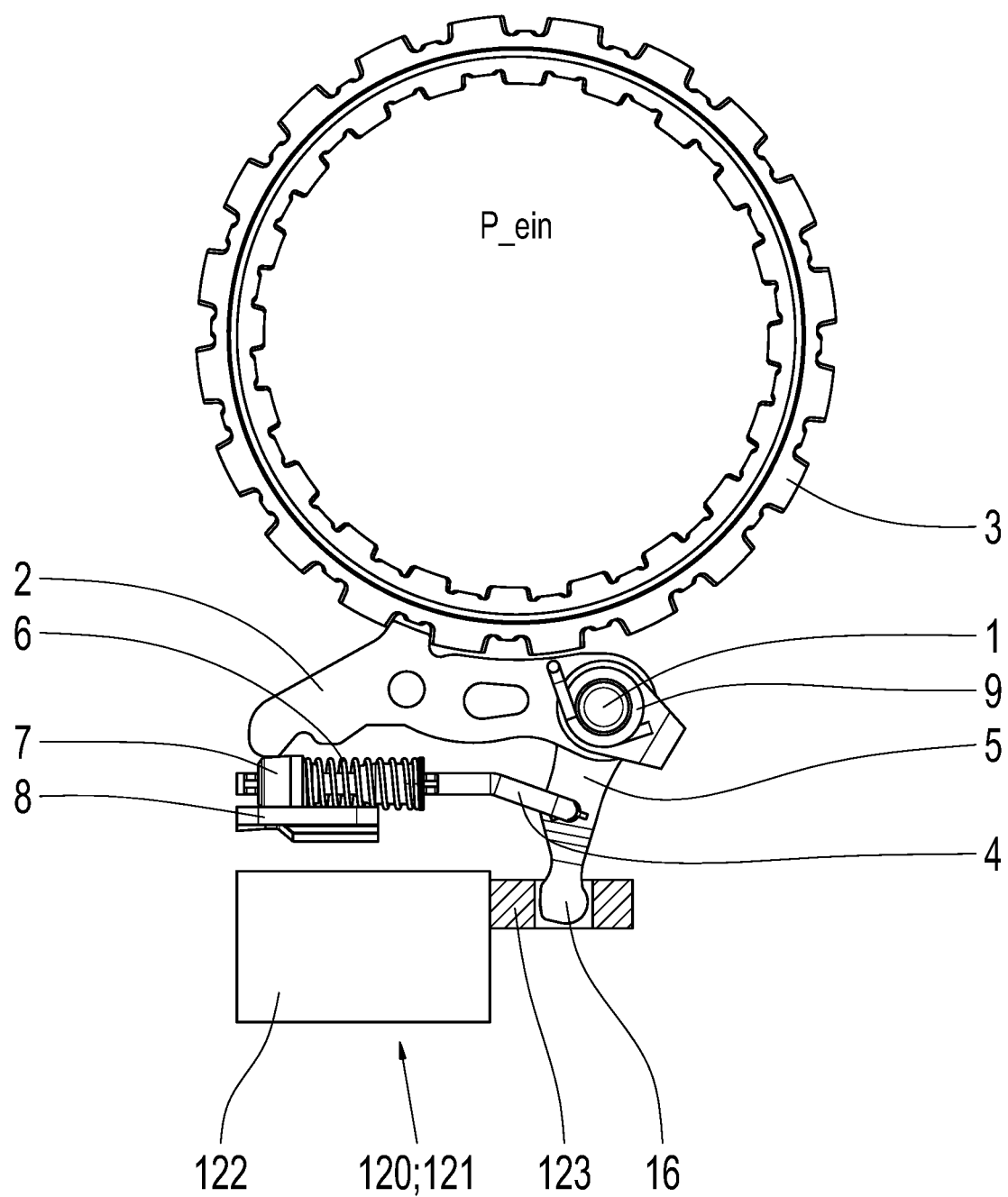
FIG. 1D shows the parking lock according to FIG. 1A including a parking lock actuator designed as an electric servo-drive.

The selection and the structural design of the parking lock actuator required for disengaging the parking lock are variable within wide limits. As an example thereof, FIG. 1D shows the parking lock represented in FIGS. 1A, 1B, and 1C including a parking lock actuator 120, which is provided for disengaging the parking lock and is designed as an electric servo-drive 121, in this case including an electric motor 122 and a spindle drive 123, by way of example. The spindle drive 123 drivable by the electric motor 122 acts on an engaging piece 16 of the selector disk 5. Advantageously, the spindle drive 123 can be designed as a self-locking gear arrangement, so that a separate device for retaining or holding the selector disk 5 in one of the end positions or in both of the end positions of the selector disk 5 can be omitted.

Figure 2A:
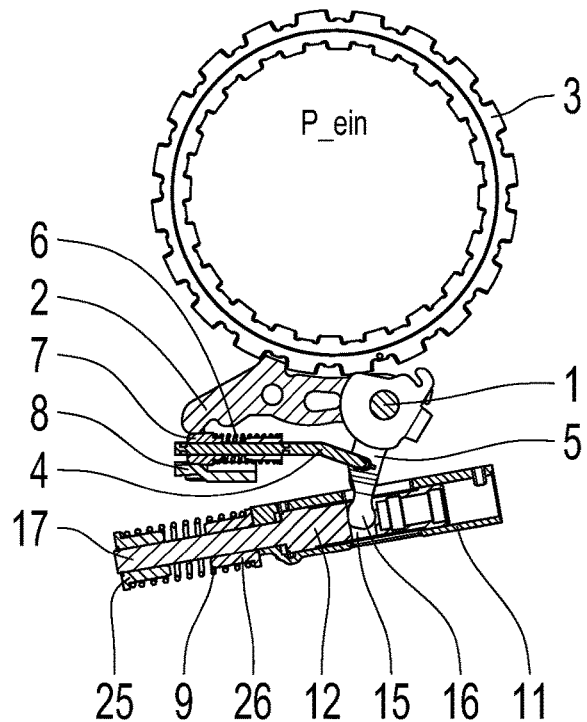
FIG. 2A shows a schematic of a second exemplary embodiment of a parking lock according to the invention in the "parking lock engaged" engagement position.
Figure 2B:
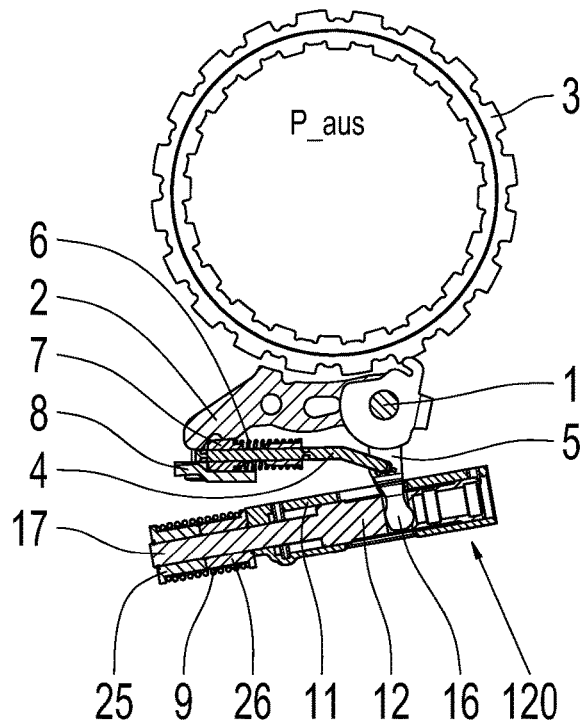
FIG. 2B shows the parking lock according to FIG. 2A in the "parking lock disengaged" engagement position.
Figure 2C:
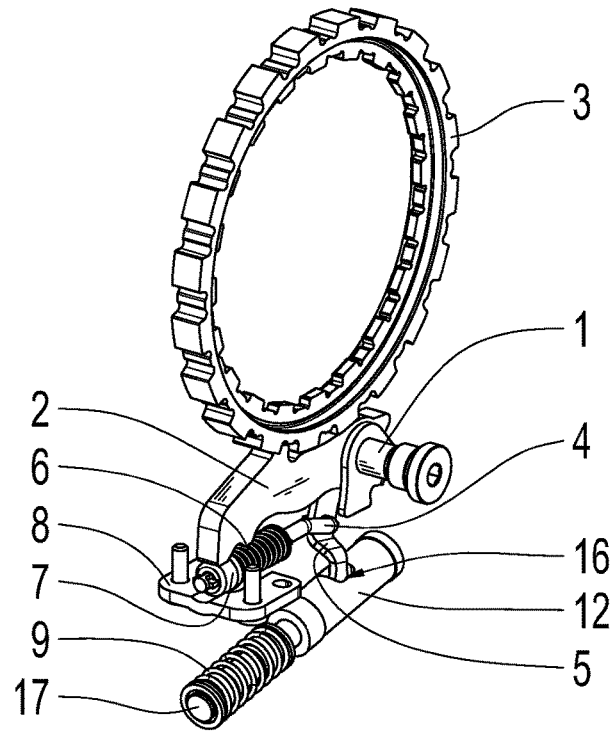
FIG. 2C shows a perspective representation of the parking lock according to FIG. 2A.

Within the scope of a second exemplary embodiment of a parking lock according to the invention represented in FIGS. 2A, 2B, and 2C, a parking lock actuator 120, which is operatively connected to the selector disk 5, is provided for disengaging the parking lock. In this case, the parking lock actuator 120 includes a hydraulically actuatable parking lock piston 12, which is axially displaceably arranged in a control housing 11 and includes a piston rod 17, which acts on an engaging piece 16 of the selector disk 5 in a force-locking manner. In this case, the engaging spring element 9 is designed as a compression spring, which, viewed axially, surrounds the piston rod 17 of the parking lock piston 12 entirely or partially concentrically. FIG. 2A shows the parking lock mechanism in the "parking lock engaged" engagement position (characterized by the reference character P_ein). FIG. 2B shows the parking lock mechanism in the "parking lock disengaged" engagement position (characterized by the reference character P_aus). FIG. 2C shows the parking lock mechanism in a three-dimensional representation.

Viewed spatially, the parking lock piston 12 is arranged below the connecting bar 4 and essentially in parallel to the connecting bar 4. In FIGS. 2A and 2B, the pressure chamber of the parking lock piston 12 is marked by the reference number 13. A detent for the parking lock piston 12 is marked by 14. In FIG. 2C, the control housing is not shown, for the sake of simplicity of the three-dimensional representation.

In this case, the pawl pin 1 is arranged under the parking interlock gear 3; moreover, the control housing 11 and the parking lock piston 12 include a recess or a slot 15, through which an engaging piece 16, which is rotationally fixed to the selector disk 5 or integrally formed with the selector disk 5, is guided in order to establish an operative connection between the selector disk 5 and the parking lock piston 12. The piston rod of the parking lock piston 12 is marked by the reference number 17. Viewed spatially, the actuation of the parking lock is therefore located, in this exemplary embodiment, below the connecting bar 4 and the locking pawl 2, which allows for a highly compact type of construction in an advantageous way.

Figure 2D:
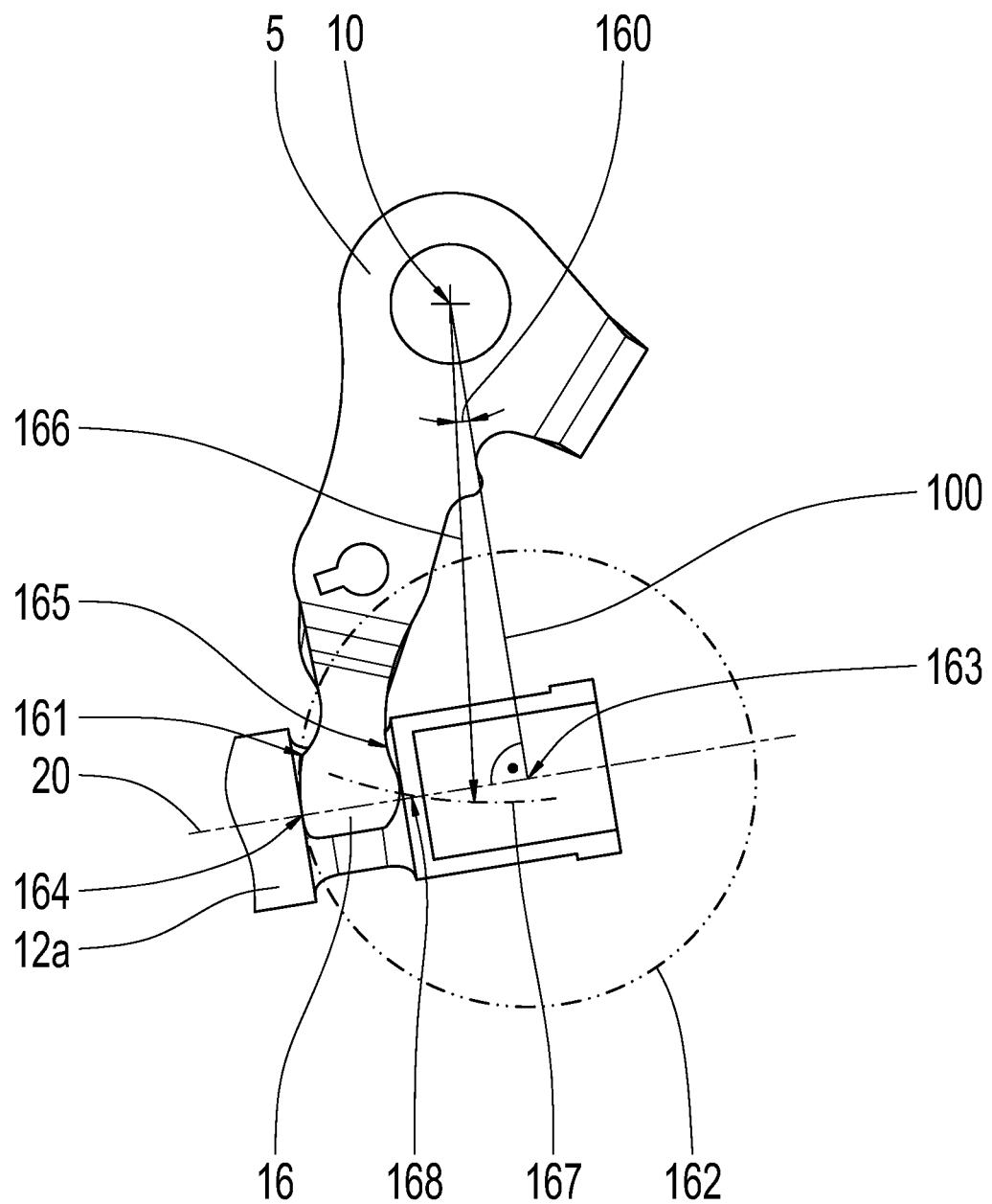
FIG. 2D shows a structural diagram for illustrating the design of the actuation area of the selector disk according to FIGS. 2A/2B/2C.

The geometric design of the engaging piece 16 of the selector disk 5 provided in FIGS. 1A, 1B, 1C, 2A, 2B, and 2C is identical and is based on the following considerations, which are explained in greater detail with reference to FIG. 2D.

The perpendicular with respect to the parking lock piston longitudinal axis 20, which is marked by 100 and intersects the selector disk axis of rotation 10, is essential for the structural design of the contour of the engaging piece 16, which is marked by 161 and represents the operative connection to the parking lock piston 12 during the disengagement of the parking lock. The point of intersection between this perpendicular 100 and the parking lock piston longitudinal axis 20 defines the center 163 of a circle 162 touching the parking lock piston 12.

It is particularly advantageous to design the contour 161 of the engaging piece 16, which represents the operative connection to the parking lock piston 12 during the disengagement of the parking lock, in such a way that all points of contact 164, at which the contour 161 of the engaging piece 16 touches the parking lock piston 12 depending on the shift angle 160 lie on the aforementioned circle 162, for every shift angle 160 of the selector disk 5 about the selector disk axis of rotation 10 possible in the operating range. In this case, the contour 161 of the engaging piece 16 forming (and facing away from the perpendicular 100) the operative connection to the parking lock piston 12 during the disengagement of the parking lock is composed of several very small circular segments having different diameters, with the result that the point of contact 164, at which the contour 161 of the engaging piece 16 touches the parking lock piston 12, always lies on the parking lock piston longitudinal axis 20 and, therefore, the lever arm of the selector disk 5 acting on the parking lock piston 12 during the disengagement of the parking lock always remains constant.

In its simplest embodiment, the contour 161 is optimized only for a specific shift angle, so that the contour 161 is then formed only by a circular segment having a constant diameter, with the result that at least one of the points of contact 164 lies on the parking lock piston longitudinal axis 20.

On the other hand, the radius around the selector disk axis of rotation 10, which is marked by 166 and intersects the parking lock piston longitudinal axis 20, is essential for the structural design of the contour of the engaging piece 16, which is marked by 165 and represents the operative connection to the parking lock piston 12 during the engagement of the parking lock. The circle defined by the radius 166 is marked by 167.

It is particularly advantageous to design the contour 165 of the engaging piece 16, which represents the operative connection to the parking lock piston 12 during the engagement of the parking lock, in such a way that the points of contact 168, at which the contour 165 of the engaging piece 16 touches the parking lock piston 12 depending on the shift angle 160, lie on the aforementioned circle 167, for every shift angle 160 of the selector disk 5 about the axis of rotation 10 of the selector disk possible in the operating range. In this case, during the engagement of the parking lock, no relative movement takes place at the contact point between the engaging piece 16 and the parking lock piston 12, since the affected sections of the engaging piece 16 and the parking lock piston 12 roll onto each other.

In the end, the engagement flanks of the selector disk 5, i.e., the contours 161 and 165 of the engaging piece 16, which are effective during the disengagement and engagement of the parking lock, respectively, are designed geometrically differently.

Four advantageous alternative structural variants of the engaging piece 16 provided in FIGS. 2A, 2B, and 2C are explained in greater detail in the following with reference to FIGS. 3 through 6.

Figure 3:
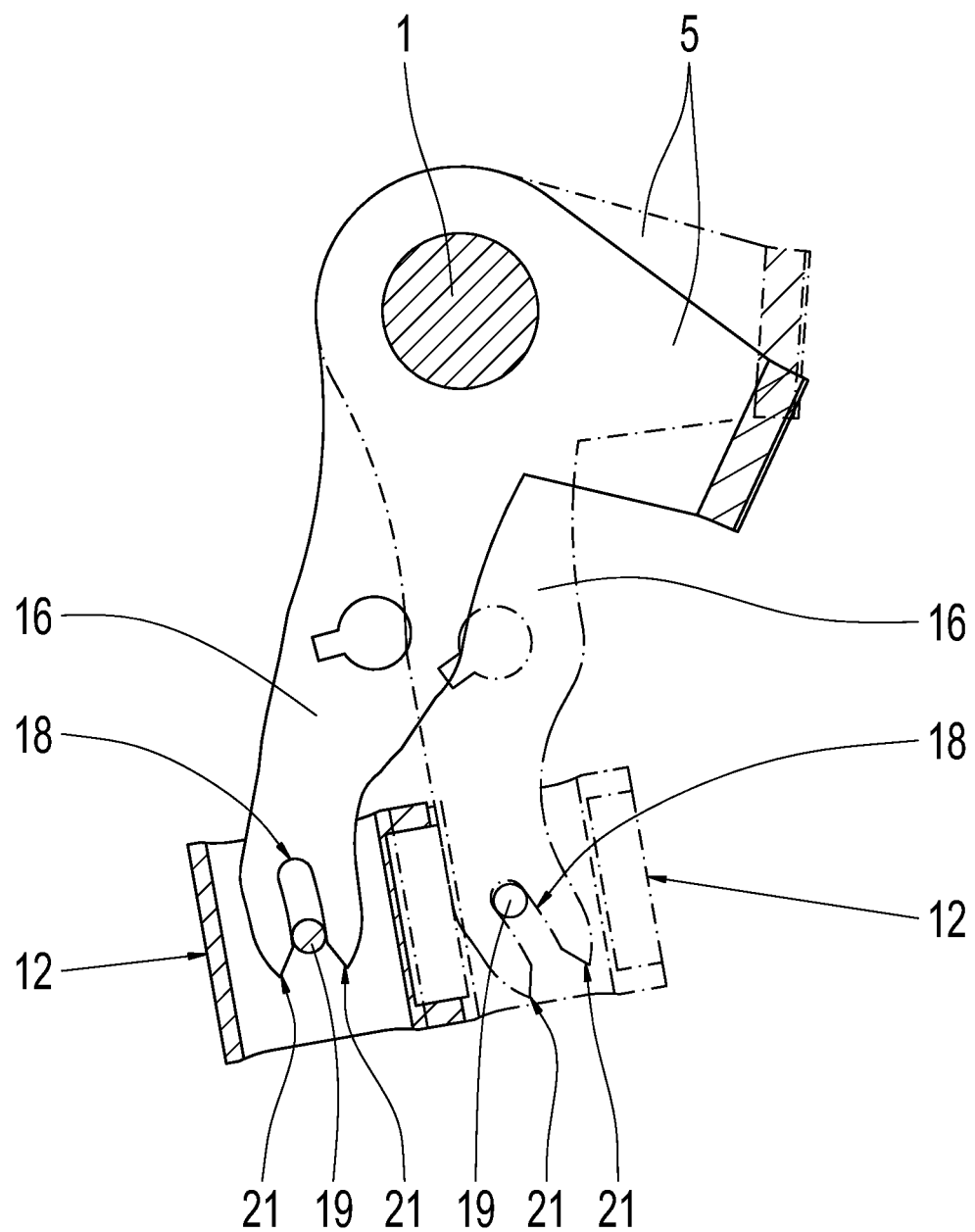
FIG. 3 shows a schematic of a first structural variant of the engaging piece according to FIGS. 2A/2B/2C.

With reference to FIG. 3, the engaging piece 16 according to the first structural variant includes a groove 18 in the actuation area, which engages into a pin 19 connected to the parking lock piston 12. The groove 18 is designed as a straight slot and the pin 19 is arranged perpendicular to the parking lock piston longitudinal axis 20. The components represented in FIG. 3 using a solid line show these components—in particular the selector disk 5 including the engaging piece 16 and the parking lock piston 12 including the pin 19—in the "parking lock engaged" engagement position, whereas the components represented in FIG. 3 using a dash-dotted line show these components in the "parking lock disengaged" engagement position.

Further advantages can be achieved with the aid of another structural design of the groove 18 of the engaging piece 16 of the selector disk 5. If the groove 18 of the engaging piece 16 of the selector disk 5 is designed, for example, to be reniform or kidney-shaped, different functionalities can be achieved with the aid of an appropriate design of the tightness and type of the curvature of the kidney shape, since the now kidney-shaped groove 18 is a type of curved path on which the pin 19 travels. For example, the kidney-shaped groove can be designed in such a way that the kidney-shaped groove results in an axial path extension of the interlocking element given an identical path of the parking lock piston 12 and, therefore, results in a rapid disengagement of the parking lock. Such an embodiment is illustrated with reference to FIG. 4, wherein P_ein marks the position of the engaging piece 16 when the parking lock is engaged and P_aus marks the position of the engaging piece 16 when the parking lock is disengaged. The curvature of the groove 18 extends, as viewed from the end of the engaging piece 16, in the direction of the axial displacement of the parking lock piston 12 during the engagement of the parking lock. During the disengagement of the parking lock, the counteracting force of the engaging piece 16 acts perpendicularly to the piston longitudinal axis 20.

Figure 4:
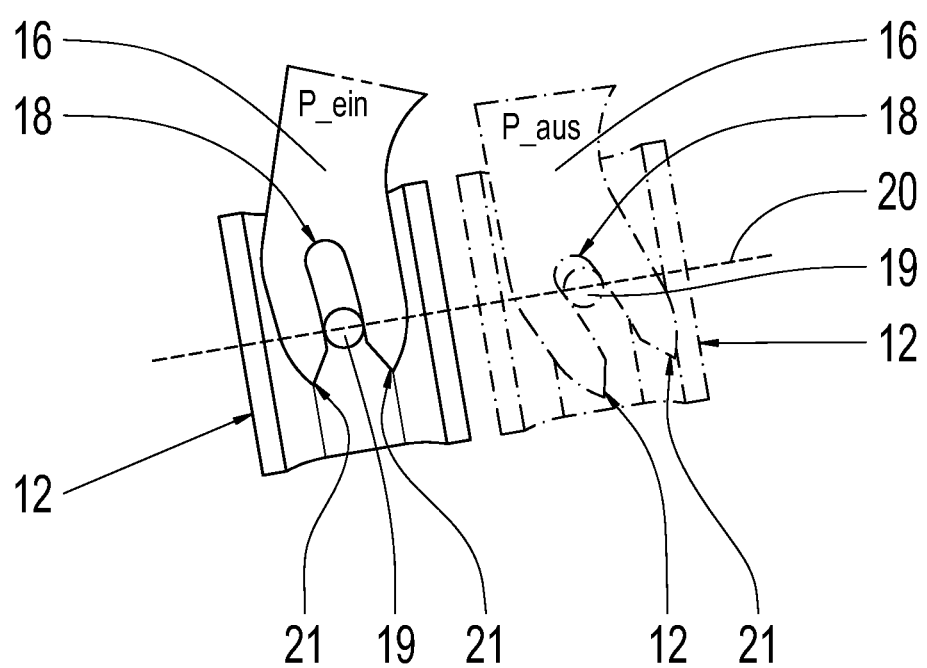
FIG. 4 shows a schematic of a second structural variant of the engaging piece according to FIGS. 2A/2B/2C.
Figure 5:
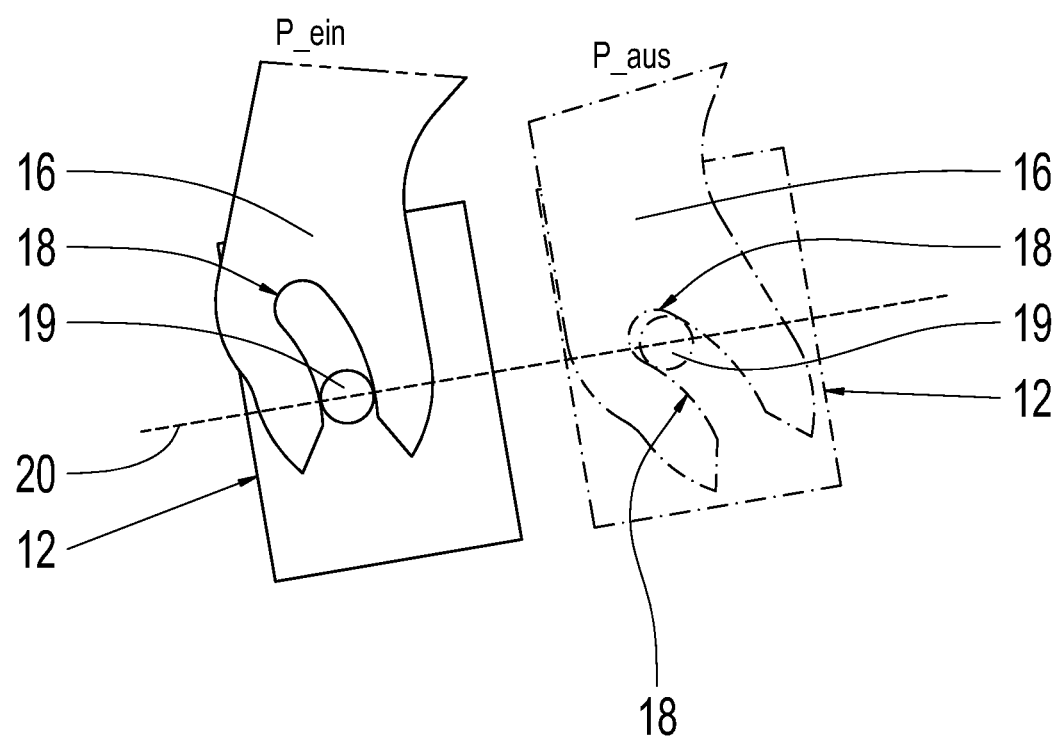
FIG. 5 shows a schematic of a third structural variant of the engaging piece according to FIGS. 2A/2B/2C.

In the exemplary embodiment according to FIG. 5, the curvature of the kidney-shaped groove 18 is tighter than in the exemplary embodiment according to FIG. 4, so that the axial path extension of the interlocking element is greater, given an identical path of the parking lock piston 12, whereby the parking lock can be disengaged faster. The tighter the curvature of the kidney-shaped groove 18, the greater the transverse force acting on the parking lock piston 12 is in this case.

Figure 6:
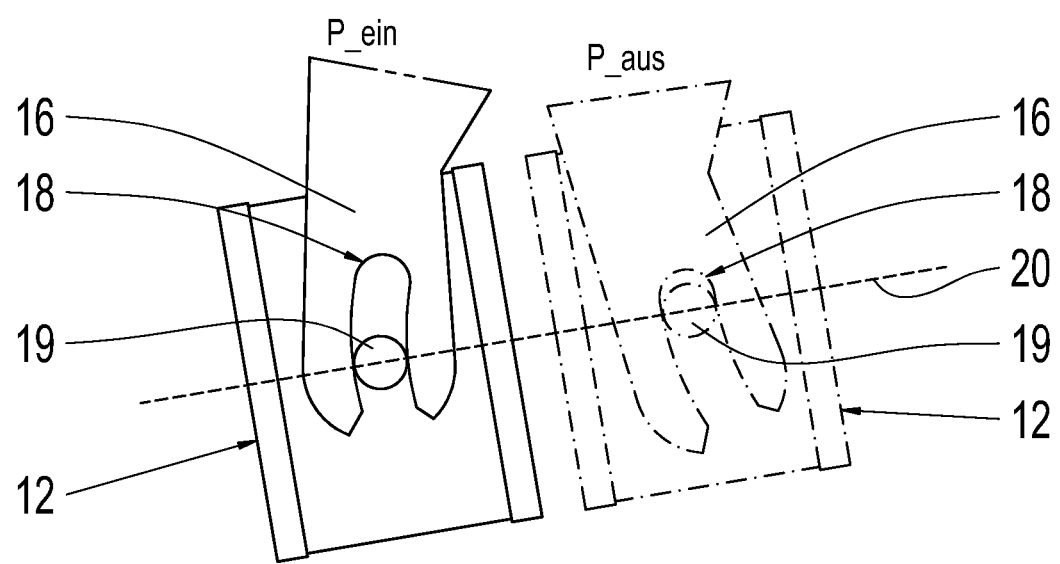
FIG. 6 shows a schematic of a fourth structural variant of the engaging piece according to FIGS. 2A/2B/2C.

The object of FIG. 6 is an exemplary embodiment, in which the kidney-shaped groove 18 has a curvature, which, as viewed from the end of the engaging piece 16, extends in the direction of the axial displacement of the parking lock piston 12 during the disengagement of the parking lock. In this way, it is ensured that no transverse forces are exerted on the parking lock piston 12 in either end position, i.e., when the parking lock is engaged and disengaged.

Figure 7:
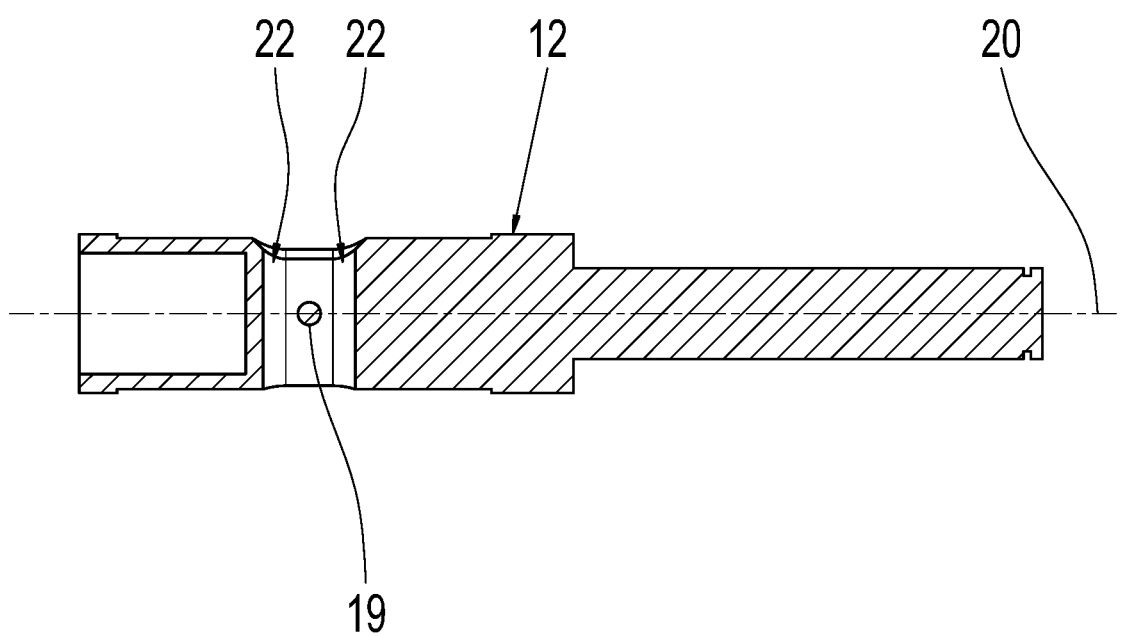
FIG. 7 shows a diagrammatic view of a part of the parking lock cylinder for illustrating lead-in chamfers on the recess for accommodating the engaging piece according to FIGS. 3 through 6.

The end of the engaging piece facing the parking lock piston 12 preferably includes lead-in chamfers, which are marked by the reference number 21 in FIG. 4 in order to facilitate the insertion of the engaging piece and the locating of the pin 19; the parking lock piston 12 can also include lead-in chamfers 22 in the area of the recess 15, in order to facilitate the insertion of the engaging piece 16, as illustrated with reference to FIG. 7.

Figure 8:
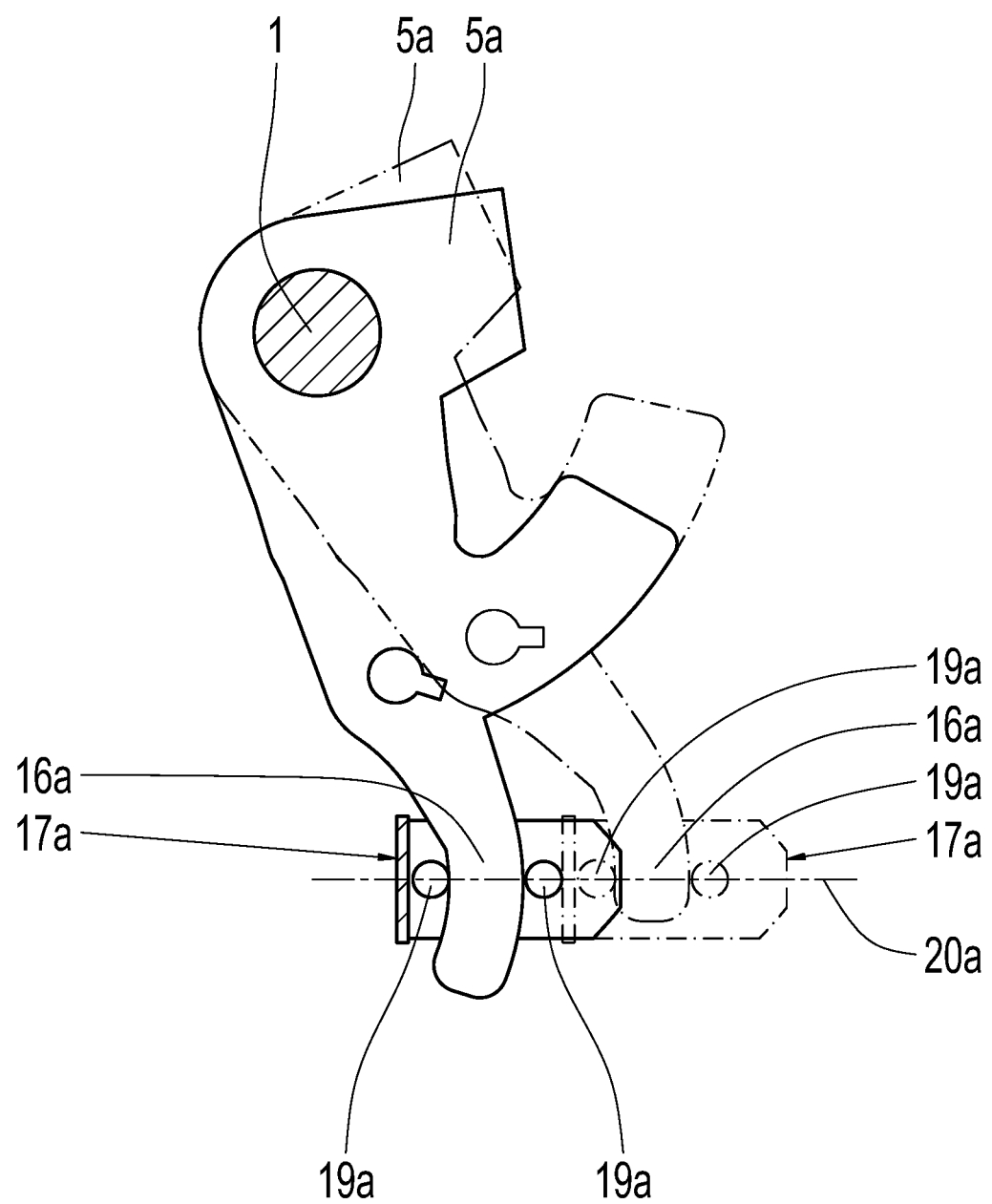
FIG. 8 shows a schematic of a third exemplary embodiment of a parking lock according to the invention.

A third exemplary embodiment of a parking lock according to the invention is explained in greater detail with reference to FIG. 8. Essentially this is a variant of the structural design of the engaging piece of the selector disk in the actuation area of this engaging piece. FIG. 8 shows a schematic of this selector disk and the operative connection to the hydraulically actuatable parking lock piston of the parking lock. In this case, the components represented in FIG. 8 using a solid line show these components in the "parking lock engaged" engagement position, whereas the components represented in FIG. 8 using a dash-dotted line show these components in the "parking lock disengaged" engagement position. For the purpose of better differentiation with respect to the above-described design, the selector disk is now marked by 5a in FIG. 8, the engaging piece of this selector disk 5 is now marked by 16a, the piston rod of the parking lock piston is now marked by 17a, and the longitudinal axis of the parking lock piston is now marked by 20a. The engaging piece 16a of the selector disk 5a actuatable by the piston rod 17a is now designed to be finger-shaped and engages into a section of the piston rod 17a delimited by two piston rod-affixed pins 19a. The two pins 19a, which have been inserted, axially parallel to the pawl pin 1, into the piston rod 17a essentially perpendicular to the parking lock piston longitudinal axis 20a, guide the engaging piece 16a during an axial movement of the piston rod 17a, so that the axial displacement of the piston rod 17a is converted into a rotation angle of the selector disk 5a.

In this case, the engaging piece 16a is curved in the actuation area in such a way that the force transmission acts in the direction of the parking lock piston longitudinal axis 20a in every position of the selector disk 5a, i.e., also during the turning of the selector disk 5a from the "parking lock engaged" position into the "parking lock disengaged" position, and vice versa. As a result, it is prevented, in a particularly advantageous way, that transverse forces are exerted onto the parking lock piston via the parking lock piston-affixed piston rod 17a, which could result in a sluggishness of the parking lock piston in the control housing bore or even in the parking lock piston becoming jammed in the control housing bore.

Assembly-related example aspects of the invention are explained in greater detail in the following.

Figure 11:
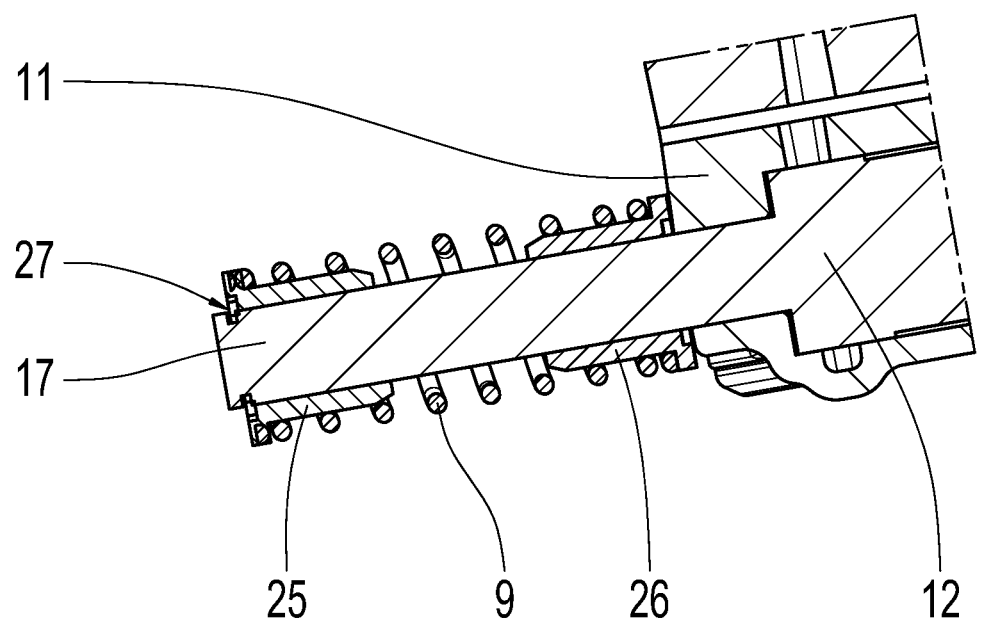
FIG. 11: shows a diagrammatic view of the third step for the assembly of the selector disk and the parking lock cylinder.

An advantageous possibility for the installation of the engaging piece 16 of the selector disk 5 into the parking lock piston 12 for the case in which the engaging spring element 9 is designed, according to an example refinement of the invention, as a compression spring, which, viewed axially, surrounds the piston rod 17 of the parking lock piston 12 entirely or partially concentrically, is illustrated with reference to FIGS. 9, 10, and 11.

Figure 9:
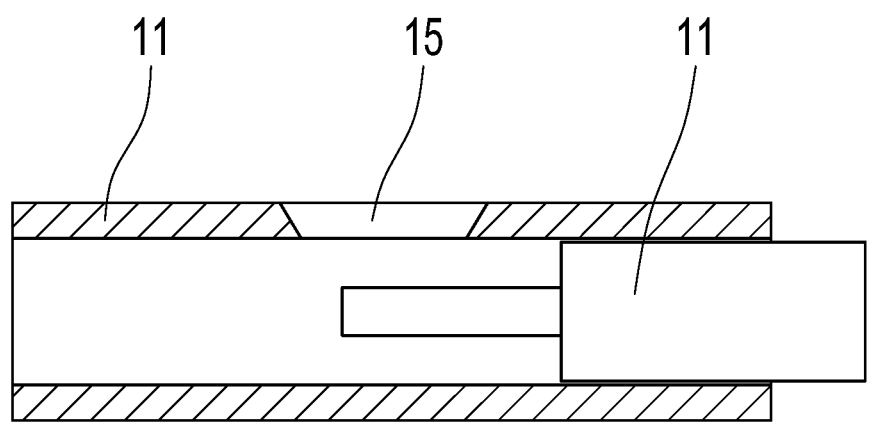
FIG. 9 shows a diagrammatic view of the first step for the assembly of the selector disk and the parking lock cylinder.

In a first step and with reference to FIG. 9, the parking lock piston 12 is slid into a suitable piston bore of the control housing 11 in the arrow direction. Thereafter, as illustrated with reference to FIG. 10, an electrically actuatable detent unit 23 is slid into this piston bore, with the aid of which the parking lock piston 12 can be held in the two end positions, "parking lock engaged" and "parking lock disengaged". It is essential that the parking lock piston 12 can be displaced into its "parking lock engaged" position only for the case in which the detent unit 23 has been energized. In the exemplary embodiment shown here, detent elements of the detent unit 23 are designed as detent hooks 24, which, in the non-energized condition, are spread apart and, only with the aid of an energization, move toward one another in such a way that the parking lock piston 12 can move axially.

Thereafter, the compression spring 9 is mounted onto the piston rod 17.

In the example shown—as illustrated with reference to FIG. 11—the compression spring 9 is guided on sleeves 25, 26, in order to protect the piston rod 17 against damage, wherein the sleeve 26 provided on the side of the compression spring 9 facing the hydraulic control unit 11 rests against the control housing 11, and the other sleeve 25, which is provided on the side of the compression spring 9 facing away from the control housing 11, is held by a snap ring-type retainer. The snap ring is radially secured against disengagement, in an advantageous way, by the sleeve 25.

Thereafter, the control housing 11 is bolted onto an electro-hydraulic transmission control unit (not described in greater detail herein) or directly onto a transmission housing (not represented herein in greater detail). In this case, the parking lock piston 12 is located in its "parking lock engaged" position, whereas the selector disk 5 is in its "parking lock disengaged" position, since a force does not prevail, which overcompresses the spring element 6, with the aid of which the interlocking element 7 is spring-loaded on the connecting bar 4. For the purpose of further installation, the detent unit 23 is energized and the compression spring 9 on the piston rod 17 is overcompressed to the extent that the piston rod 17 reaches its "parking lock disengaged" position, wherein, for the case in which the parking lock piston 12 reaches its "parking lock disengaged" position, the energization of the detent unit 23 is interrupted, so that the detent unit 23 then drops into its "parking lock disengaged" position.

Figure 12A:
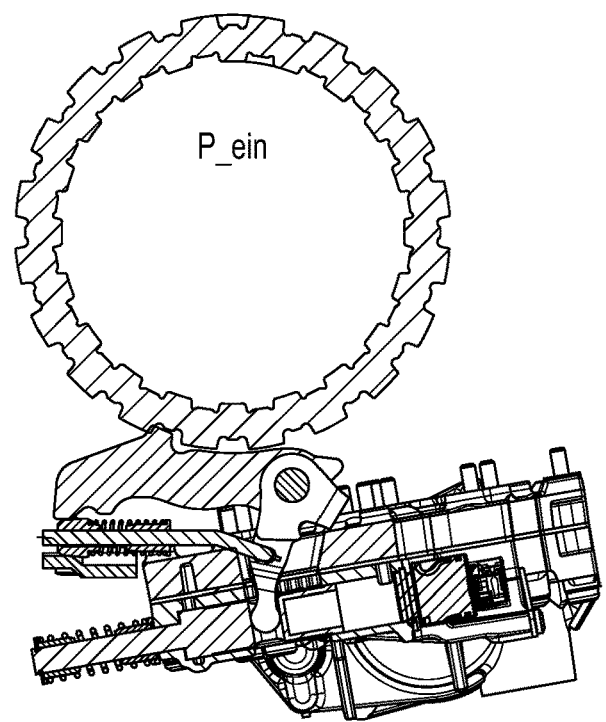
FIG. 12A shows a schematic of a fourth exemplary embodiment of a parking lock according to the invention in the "parking lock engaged" engagement position.
Figure 12B:
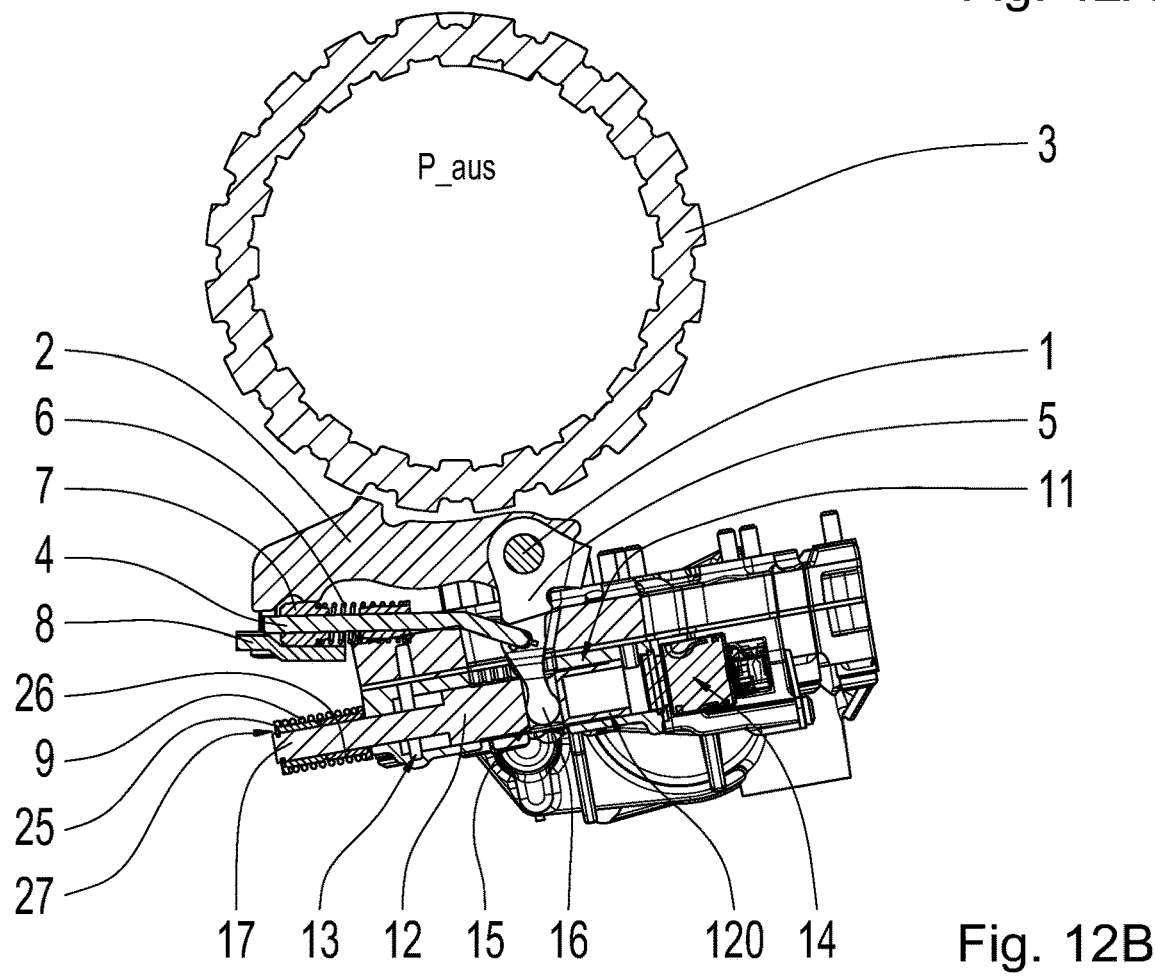
FIG. 12B shows the parking lock according to FIG. 12A in the "parking lock disengaged" engagement position.

In this way, the engaging piece 16 of the selector disk 5 and the recess 15 of the parking lock piston 12 are arranged one above the other in the "parking lock disengaged" position, so that the engaging piece 16 can be guided on the pin 19 in a targeted manner with the aid of a suitable tool. The assembly method presented here has the advantage, on the one hand, that the selector disk 5 must no longer be overcompressed by hand; on the other hand, the vehicle can be pushed without initiating further measures, since the parking lock is disengaged. The condition after the described assembly is the object of FIGS. 12A and 12B, in which a fourth exemplary embodiment of a parking lock according to the invention is represented. FIG. 12A shows the parking lock mechanism with the parking lock engaged (reference character P_ein), FIG. 12B shows the parking lock mechanism with the parking lock disengaged (reference character P_aus).

Due to the design of the engaging spring element 9 as a compression spring, which, viewed axially, surrounds the piston rod 17 of the parking lock piston 12 entirely or partially concentrically, the bearing base of the pawl pin bearing for supporting the pawl pin 1 is reduced in size, whereby the force transmission into the transmission housing is optimized. A further advantage is that a compression spring has fewer losses due to friction than a torsion spring; in addition, greater actuating forces can be implemented with the aid of a compression spring.

Figure 13:
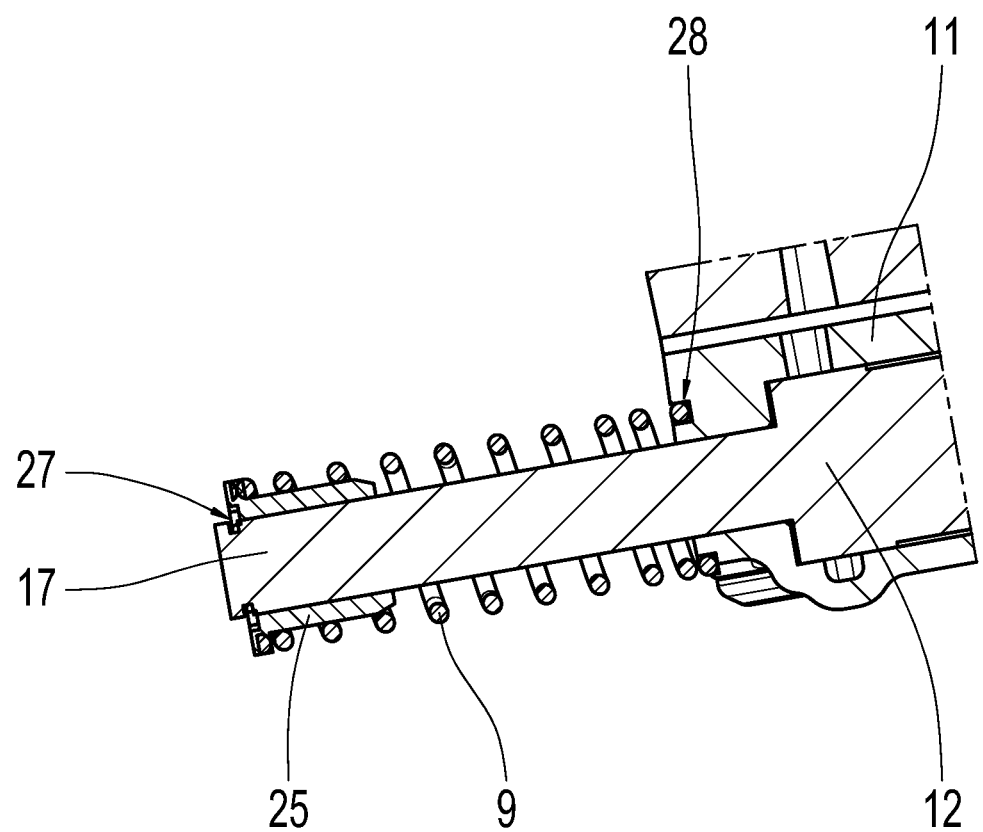
FIG. 13: shows a diagrammatic sectional view of a possible structural design of the mounting of the compression spring in the parking lock according FIGS. 12A/12B.

The retention of the compression spring on the side facing away from the hydraulic control unit can also take place with the aid of a nut or with the aid of a pin or with the aid of one or more machine elements. Moreover, the sleeve provided on the side of the compression spring 9 facing the control housing 11 in FIG. 12 can be omitted, wherein a circular groove 18 extending around the central axis of the piston rod is then provided on the control housing 11, in which the end of the compression spring 9 facing the control housing 11 lies and, as a result, is kept away from the contact surface of the piston rod 17. The end of the compression spring 9 facing away from the control housing 11 is guided, similarly to the embodiment represented in FIG. 12, on a sleeve 25, which is held by a snap ring-type retainer 27, wherein the snap ring is radially secured against disengagement by the sleeve 25. This advantageous embodiment according to the invention is the object of FIG. 13.

Figure 14A:
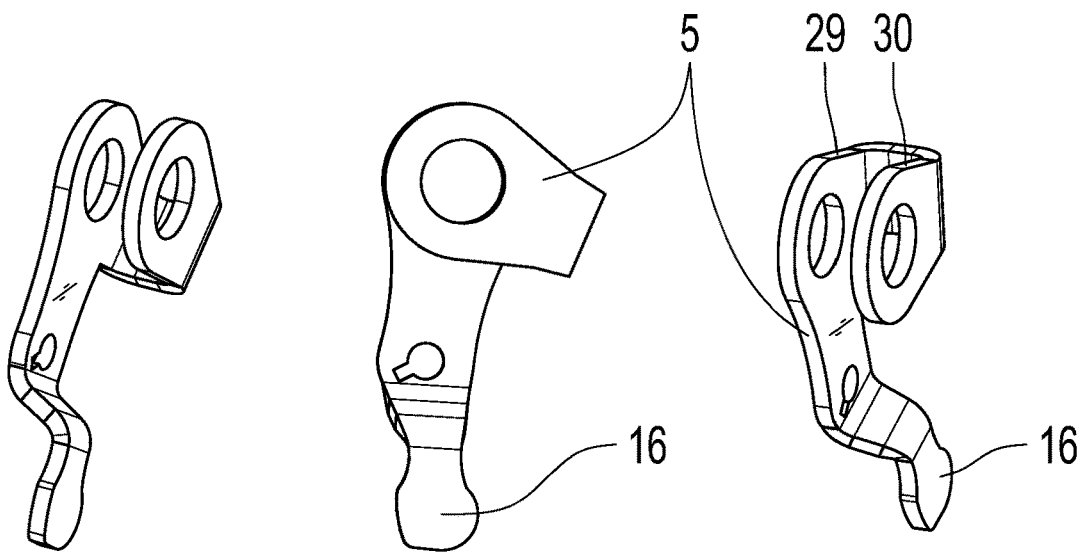
FIG. 14A, FIG. 14B, and FIG. 14C show various views of different embodiments of the selector disk.
Figure 14B:
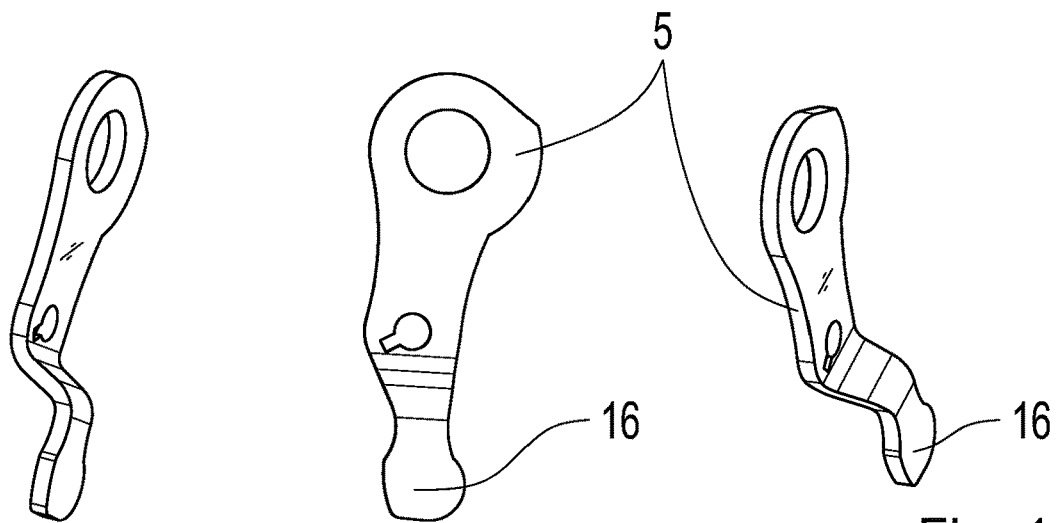
Figure 14C:
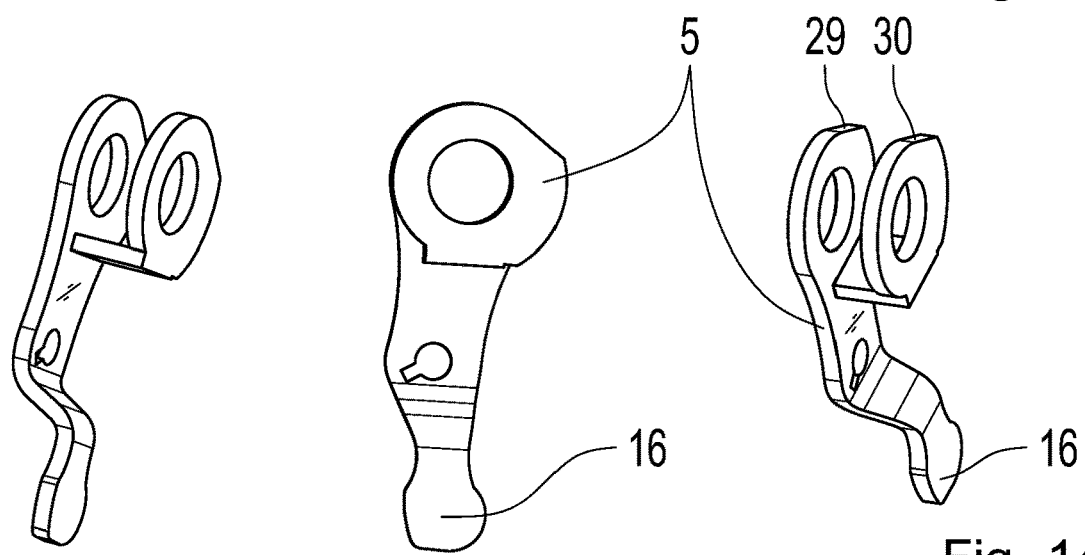

Exemplary embodiments of the selector disk 5 mounted on the pawl pin are explained in greater detailed in the following with reference to FIGS. 14A through 14C. As shown in FIG. 14A and FIG. 14C, the selector disk 5 can include two legs 29, 30, each of which includes a circular bore, wherein the bores are arranged coaxially to each other and are utilized for mounting the selector disk 5 on the pawl pin (not shown here), wherein the locking pawl (also not shown here) is mounted between the two legs. As shown in FIG. 14B, the selector disk 5 can also include only one circular bore, however, which is utilized for mounting the selector disk 5 on the pawl pin (not shown here).

According to an advantageous refinement of the invention and with reference to the FIGS. 15, 16, 17A, and 17B, it is provided, in order to hold down the locking pawl, which is now marked by reference character 2a, in the disengaged condition of the parking lock, that a stop of the locking pawl 2a is provided on the selector disk—which is now marked by reference character 5b—which, in the disengaged condition of the parking lock, prevents the locking pawl 2a from touching the parking interlock gear (not represented in greater detail in the figures), whereby a rattling of the locking pawl 2a is prevented.

Figure 15:
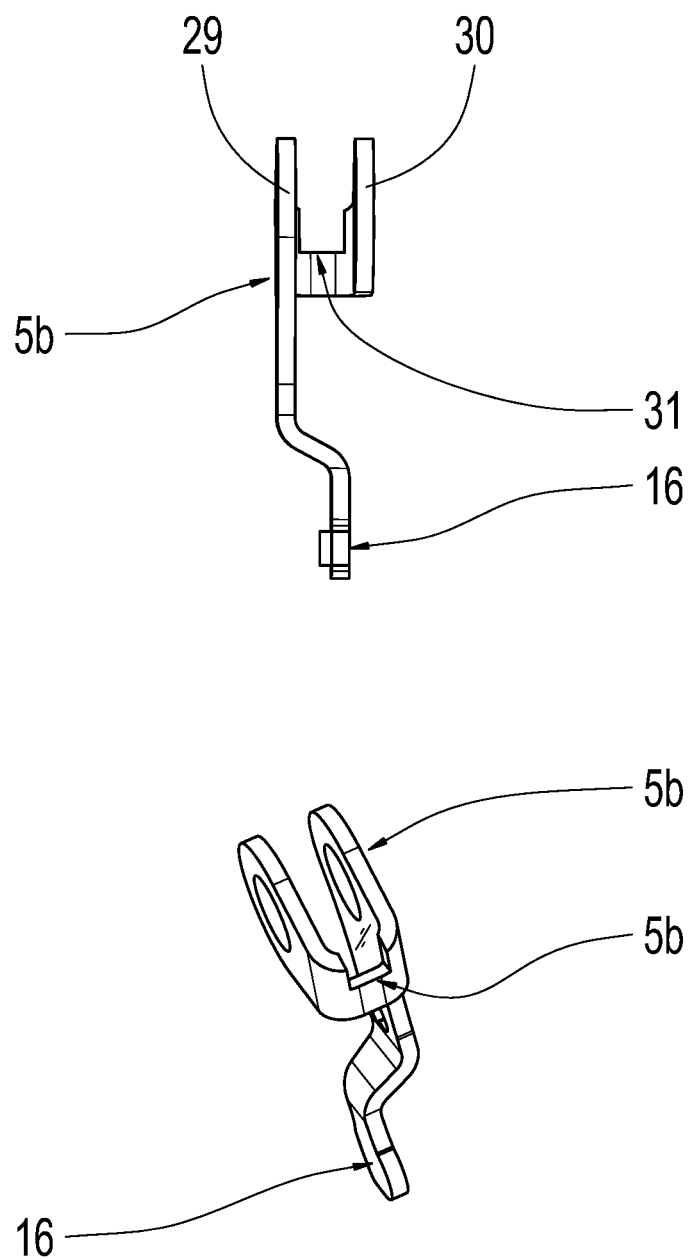
FIG. 15 shows a perspective view of a selector disk including a stop surface for the locking pawl.
Figure 16:
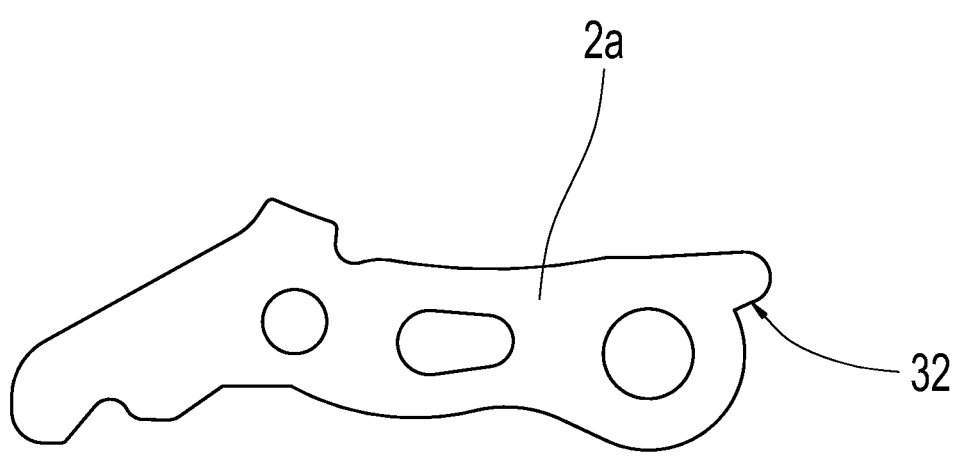
FIG. 16 shows a view of a locking pawl including a stop surface for the operative connection to the stop surface of the selector disk.

The stop on the selector disk 5b can be formed, for example, by a recess, a caulking, by a hook or a nose, or by bolted-on machine elements, etc. The corresponding stop on the locking pawl 2 can be formed by a nose or a hook, by bolted-on machine elements, by crimping, caulking, etc. As an exemplary embodiment for a stop, FIG. 15 shows a selector disk 5b including a stop surface 31 designed as a recess, and FIG. 16 shows a locking pawl 2a including a stop surface 32, corresponding to the stop surface 31, on a nose integrally formed onto the locking pawl 2a. Similarly to the designs shown in FIG. 14A and FIG. 14C, the selector disk 5 also includes two legs 29, 30, each of which includes a circular bore, wherein these bores are arranged coaxially to each other and are utilized for mounting the selector disk 5 on the pawl pin (not shown here), wherein the locking pawl (also not shown here) is mounted between the two legs 29, 30. As viewed in the direction of the longitudinal axis of the pawl pin, the stop surface 31 is located axially parallel to the longitudinal axis of the pawl pin in an area axially between the two legs 29, 30.

Figure 17A:
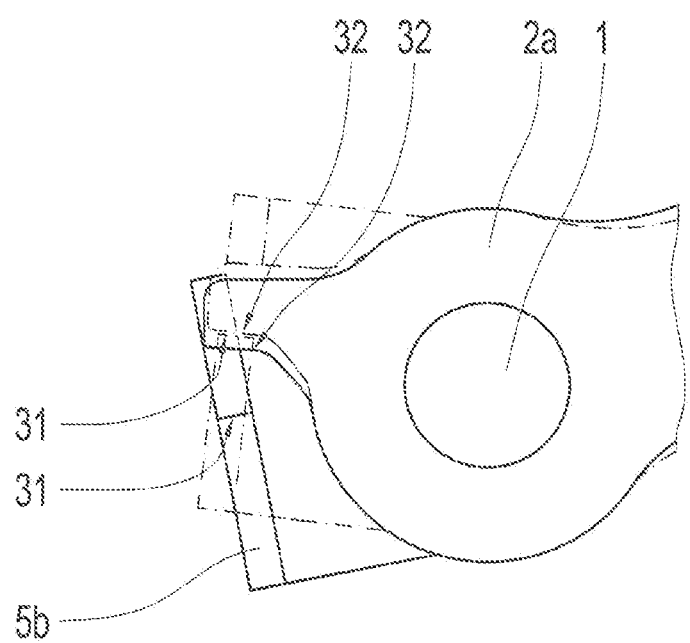
FIG. 17A shows a diagrammatic part view of the selector disk according to FIG. 15 and the locking pawl according to FIG. 16 for illustrating the mode of operation of the holding-down of the locking pawl in the disengaged condition of the parking lock.

The functional principle of the described embodiment of the locking pawl 2a and of the selector disk 5b for holding down the locking pawl 2 of the parking lock in the disengaged condition (P_aus) is illustrated with reference to FIGS. 17A and 17B. FIG. 17A shows the section of the locking pawl 2a, in an enlarged representation, on which the stop surface 32 is arranged. The components represented in FIG. 17A using a solid line show these components in the "parking lock engaged" engagement position, whereas the components represented in FIG. 17A using a dash-dotted line show these components in the "parking lock disengaged" engagement position. When the parking lock is disengaged, the locking pawl 2a cannot reach the parking interlock gear, since the stop surface 32 of the locking pawl 2a rotatably mounted on the pawl pin 1 impacts the corresponding stop surface 31 of the selector disk 5b, which is also rotatably mounted on the pawl pin 1.

Figure 17B:
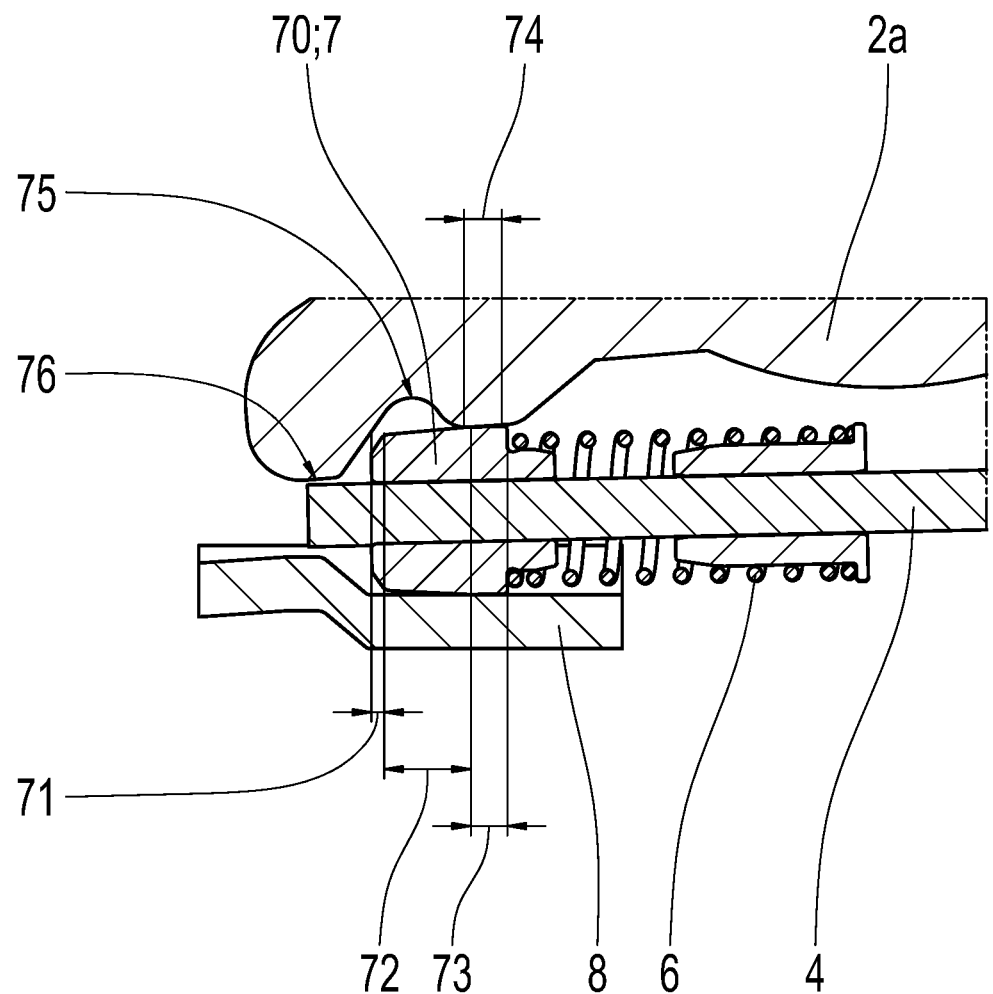
FIG. 17B shows a second diagrammatic part view of the locking pawl according to FIG. 16 for illustrating the mode of operation of the holding-down of the locking pawl in the disengaged condition of the parking lock.

FIG. 17B shows, in an enlarged representation, the section of the locking pawl 2a, on which the interlocking element 7 rests against the locking pawl 2a, wherein the locking pawl 2a is in its "parking lock disengaged" engagement position (P_aus). In the exemplary embodiment represented in FIG. 17B, the interlocking element 7 is designed, in a known way, as a locking cone 70, which—as usual—is subdivided into three segments, namely into a lifting chamfer 71, an interlock area 72 provided with an interlock chamfer, and a cylindrical guide area 73. The impact contour 74 of the locking pawl 2a is designed in such a way that the swiveling motion of the locking pawl 2a is limited in the downward direction by the cylindrical guide area 73 of the locking cone 70, in the entire lifting range of the locking cone 70, in which the locking cone 70 is not in its interlock position, i.e., is not in its "parking lock engaged" engagement position. As a result, it is ensured that the locking pawl 2a, in the entire lifting range in which the locking cone 70 is not in it interlock position, does not impact the lifting chamfer 71, nor the interlock area 72, and also not the connecting bar 4, which is readily apparent in FIG. 17B with reference to the critical locking pawl section 75 close to the interlock area 72 and with reference to the critical locking pawl section 76 close to the connecting bar 4. In a particularly advantageous way, damage, which can adversely affect the parking lock function, is reliably prevented with the aid of this structural design.

The stop of the locking pawl on the selector disk can be differently designed in this case, which is explained in greater detail in the following with reference to FIGS. 18 through 21.

Figure 18:
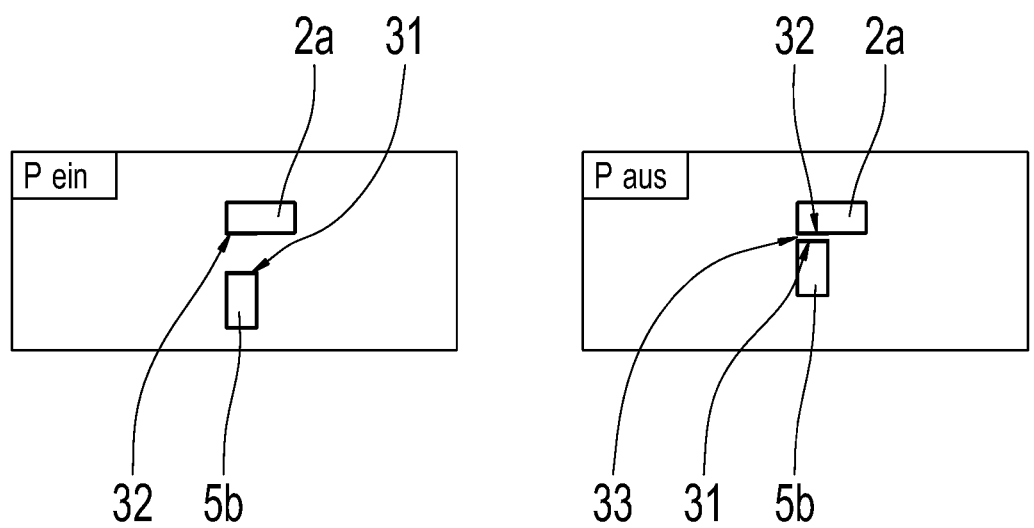
FIG. 18, FIG. 19, FIG. 20.

With reference to FIG. 18, the left part of which represents the condition having an engaged parking lock (P_ein) and the right part of which represents the condition having a disengaged parking lock (P_aus), a gap 33 can be provided between the stop surface 32 of the locking pawl 2a and the stop surface 31 of the selector disk 5b in the disengaged condition (P_aus) of the parking lock. If the locking pawl 2a swings in the disengaged condition (P_aus) of the parking lock, the stop surface 32 of the locking pawl 2a impacts the stop surface 31 of the selector disk 5b, whereby the locking pawl 2a is held down.

Figure 19:
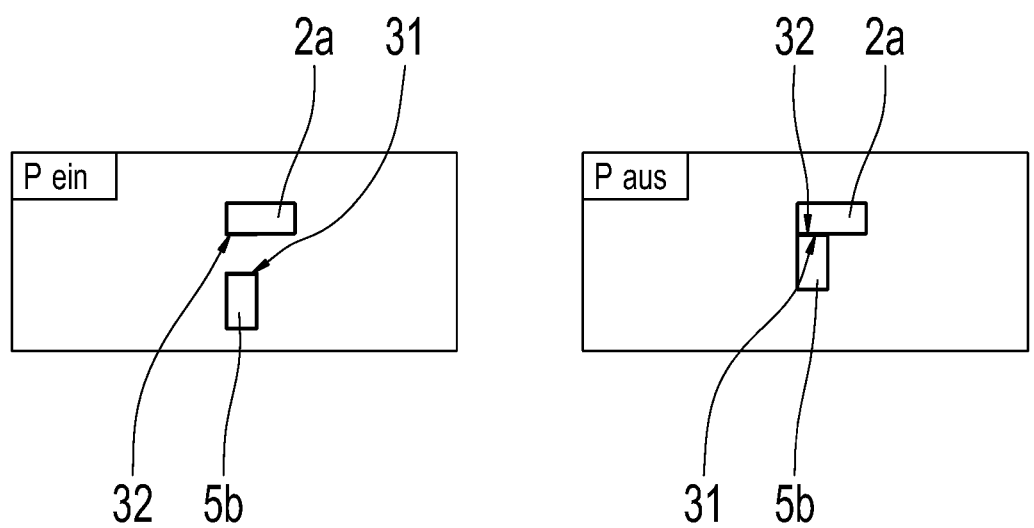

The object of FIG. 19, the left part of which represents the condition having an engaged parking lock (P_ein) and the right part of which represents the condition having a disengaged parking lock (P_aus), is an embodiment in which a gap is not provided between the stop surfaces 31, 32 in the disengaged condition of the parking lock (P_aus), so that a swinging of the locking pawl 2a is prevented in an advantageous way. Within the scope of a refinement of the invention, the stop implemented in this way can also act as a stop of the parking lock cylinder when the parking lock is disengaged.

Figure 20:
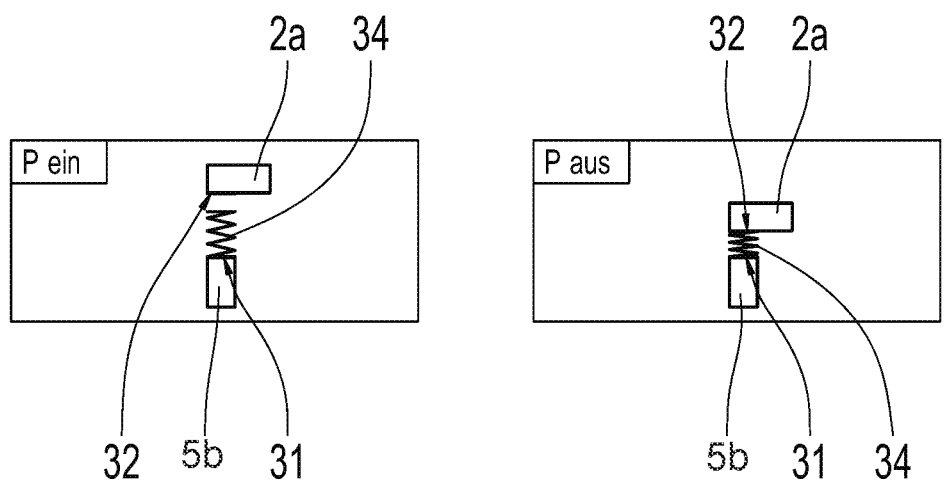
Figure 21:
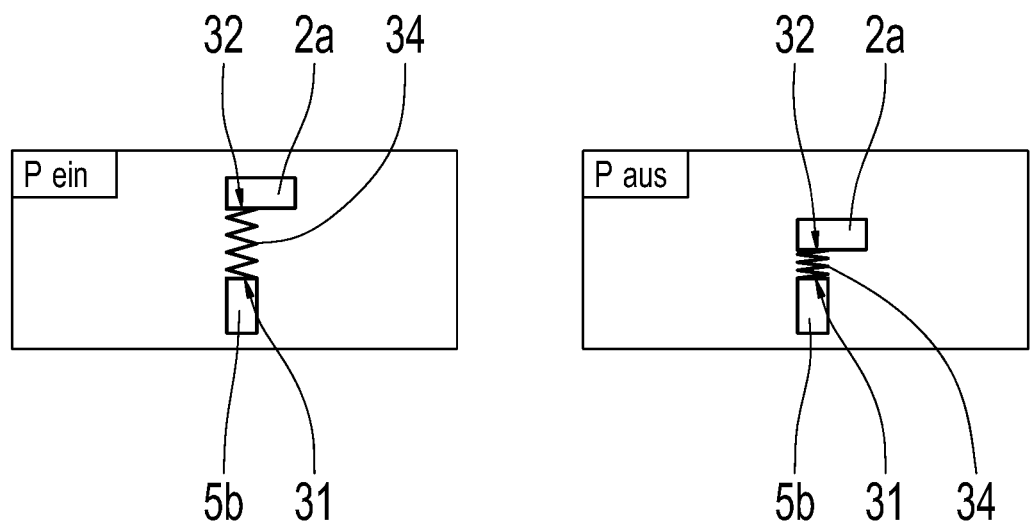
FIG. 21 show principle representations of different example embodiments of the stop of the locking pawl on the selector disk.

According to another embodiment, which is the object of FIG. 20, a spring element 34 can be arranged on one of the two stop surfaces 31, 32, i.e., either on the stop surface 32 of the locking pawl 2a and on the stop surface 31 of the selector disk 5b, whereby tolerances can be compensated for. As a result, a gap 33 is provided between these stop surfaces 31, 32 in the disengaged condition of the parking lock (P_aus); the spring element 34 can be designed as a compression spring, a leaf spring, a torsion spring, or a torsion spring. If the locking pawl 2a swings in the disengaged condition (P_aus) of the parking lock, the swinging is decelerated with the aid of the spring element 34, whereby the locking pawl is held down.

Within the scope of a further advantageous embodiment, it is provided that a spring element 34 is arranged between the stop surface 32 of the locking pawl 2a and the stop surface 31 of the selector disk 5b, which can be designed in such a way that the spring element 34 assists or replaces the engaging spring element during the engagement of the parking lock. This embodiment is the object of FIG. 21. Due to the replacement of the engaging spring element 9, which is designed as a torsion spring or a compression spring, by the spring element 34, the remaining configuration of the parking lock according to example aspects of the invention—as it is disclosed within the scope of this description—remains unchanged. It is possible, for example, that the engaging spring element 9 is omitted in the example embodiments according to FIG. 1, FIG. 2, and FIG. 12, wherein the holding-down of the locking pawl, which is marked by reference number 2 in these figures, in the disengaged condition of the parking lock is implemented according to FIG. 21 and the engaging spring element 9 is replaced by the spring element 34.

Figure 22:
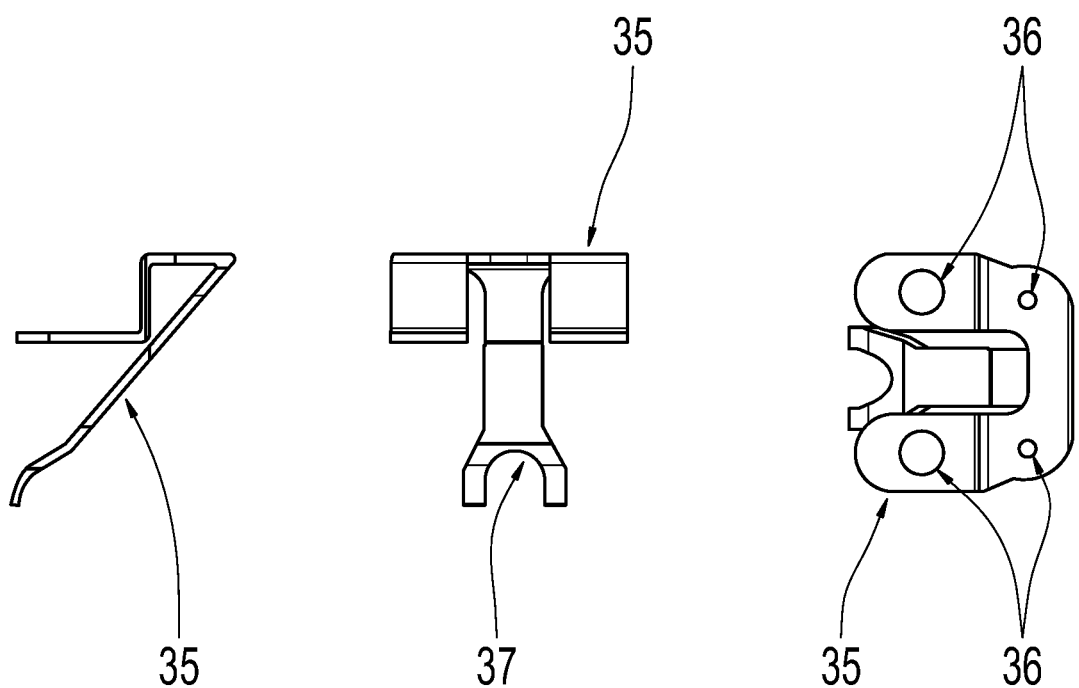
FIG. 22 shows views of a leaf spring acting as an engaging spring element according to an example embodiment of the invention.
Figure 23:
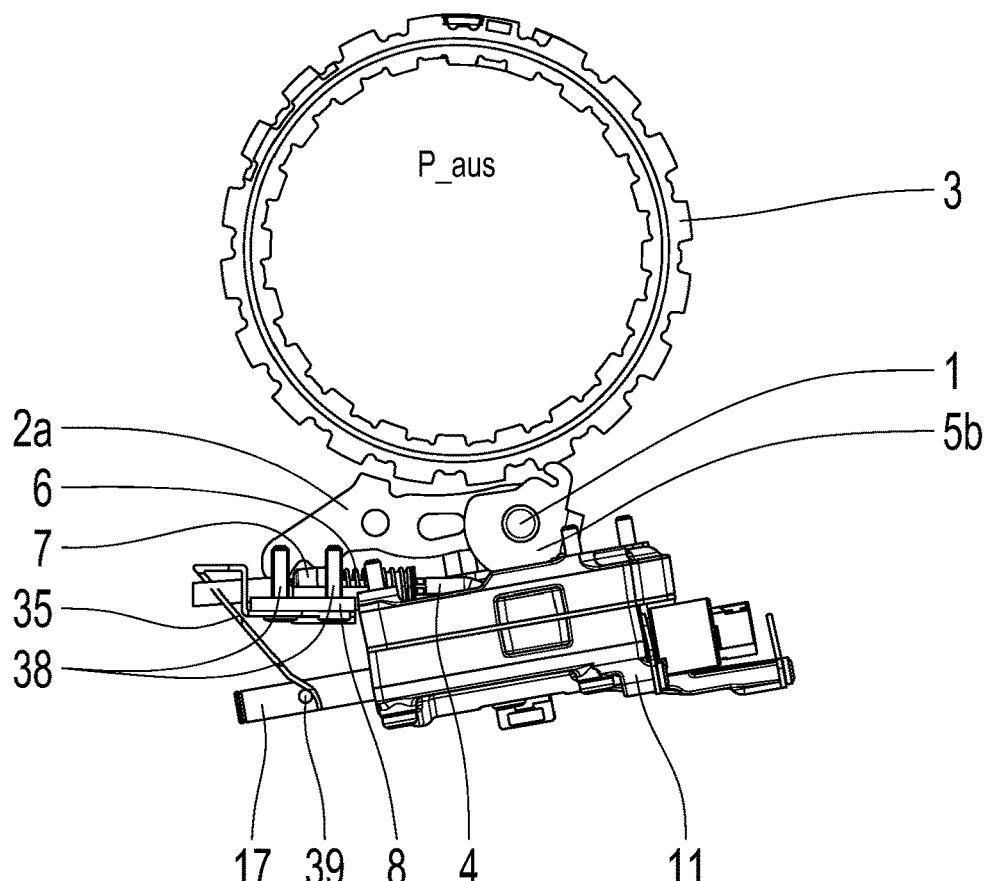
FIG. 23 shows a diagrammatic view of a parking lock according to an example embodiment of the invention including an engaging spring element according to FIG. 22.
Figure 24:
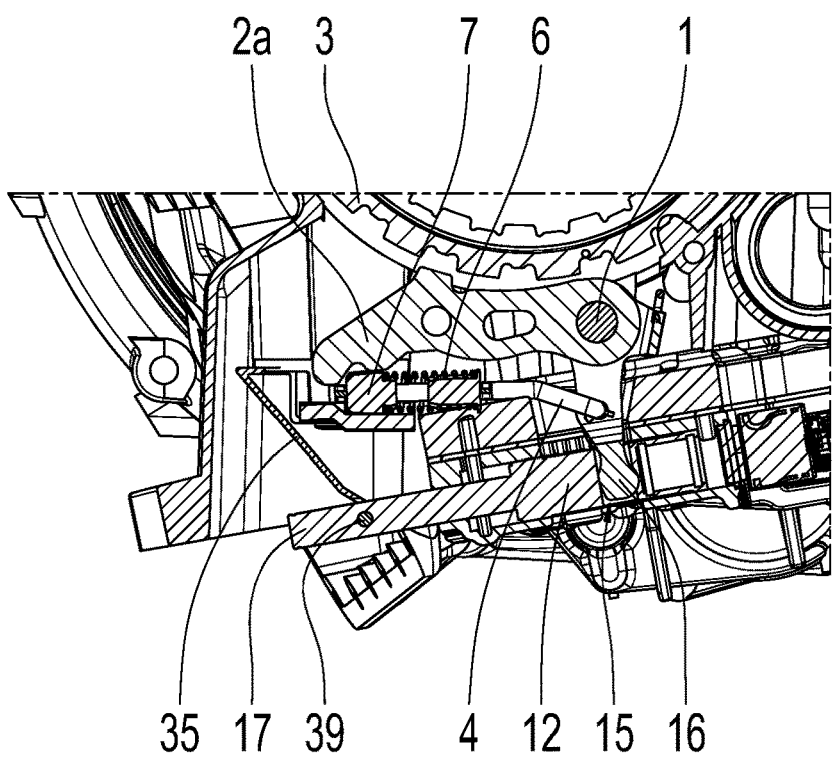
FIG. 24 shows a sectional cross section of the parking lock according to FIG. 23.

According to a further example embodiment of the invention and with reference to FIG. 22, FIG. 23 and FIG. 24, the engaging spring element 9 is designed as a leaf spring 35, whose one end is mounted into the transmission with the aid of bolts and bolt connection points 36. As an exemplary design of such a leaf spring 35, FIG. 22 shows various views of a particularly space-saving embodiment, in which the leaf spring 35 can be mounted on the guiding plate 8 with the aid of the guiding plate bolted connection 38, as is apparent in FIG. 23. FIG. 23 shows the corresponding parking lock mechanism in the case of a disengaged parking lock (reference character P_aus). FIG. 24 shows a sectional section of this parking lock mechanism. The other end of the leaf spring 35 engages, in the installed condition, via a fork-shaped contour 37, onto the piston rod 17 of the parking lock piston 12 with the aid of a pin 39 captively mounted in the piston rod 17.

Figure 25:
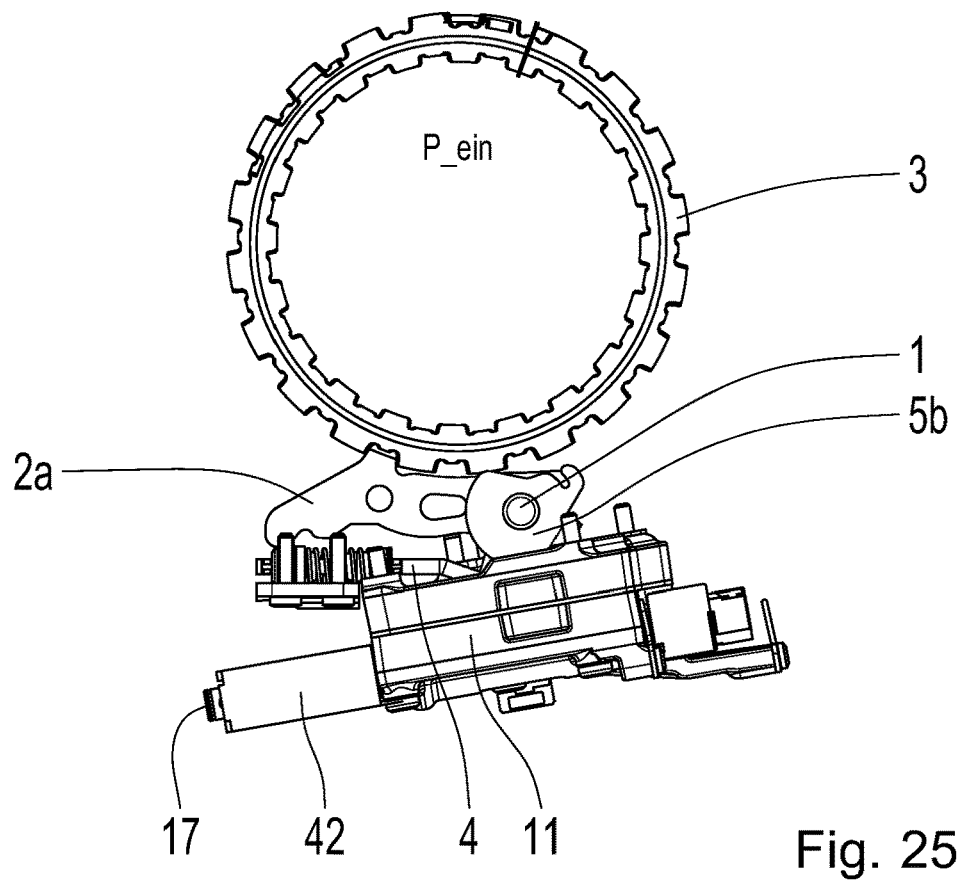
FIG. 25 shows a diagrammatic view of a parking lock according to example aspects of the invention, in which at least two compression springs arranged in parallel to one another are provided as the engaging spring element.
Figure 26:
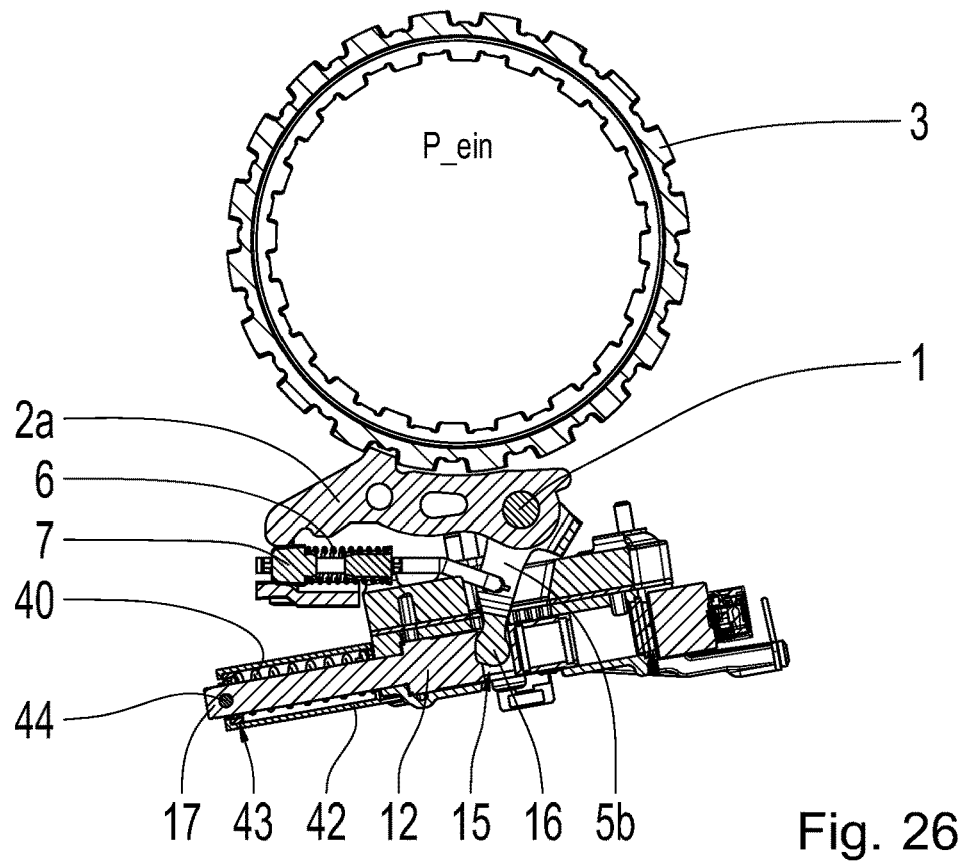
FIG. 26 shows a sectional section of the parking lock according to FIG. 25.
Figure 27:
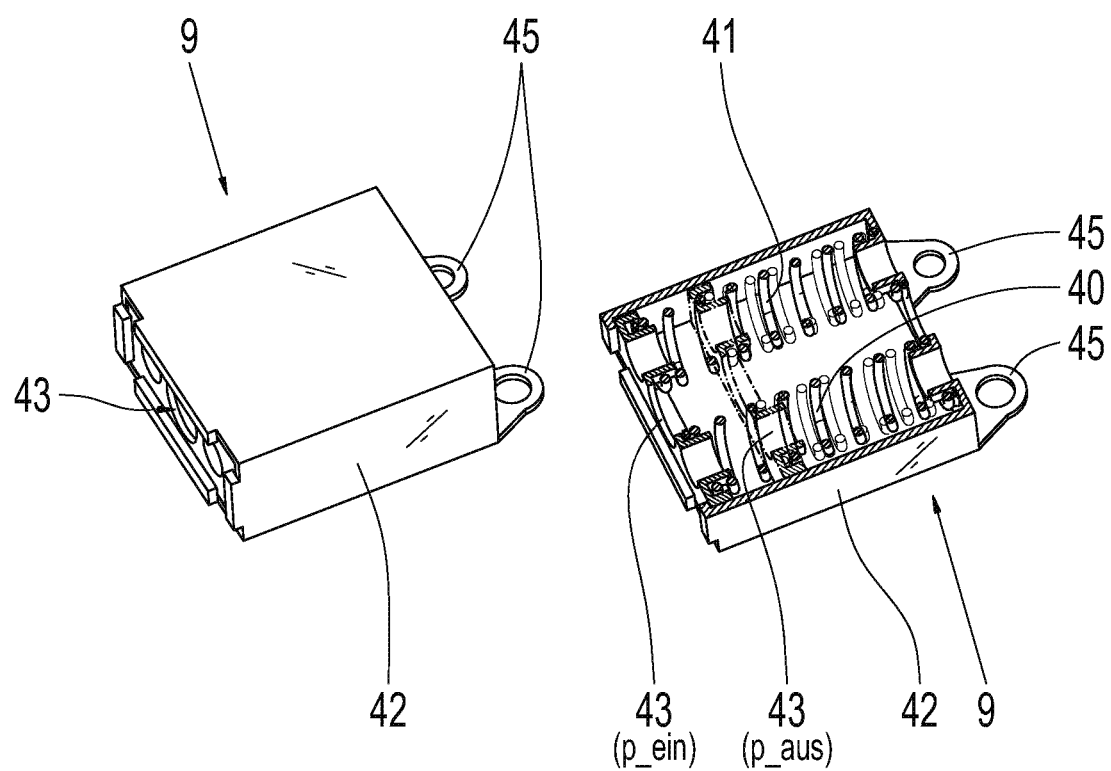
FIG. 27 shows a diagrammatic detailed view and a diagrammatic sectional view of an engaging spring element according to FIG. 25.

Within the scope of a further embodiment of the invention and with reference to FIG. 25, FIG. 26 and FIG. 27, it is provided that at least two compression springs 40, 41 arranged in parallel to one another are provided as the engaging spring element 9 and are arranged, in parallel to the piston rod 17 of the parking lock piston 12, in a spring guide 42 connected to the control housing 11 and are guided therein. Due to this embodiment, the force of the engaging spring element is increased, in an advantageous way, in combination with a small amount of necessary installation space. The piston rod 17 is guided by the spring guide 42 in the example shown. This parking lock mechanism is shown in the case of an engaged parking lock (reference character P_ein) in a schematic in FIG. 25 and in a sectioning in FIG. 26.

In this case, a displacement travel of the at least two compression springs 40, 41 is made possible with the aid of a spring guide slide 43, which is operatively connected to the piston rod 17 of the parking lock piston 12, is displaceably arranged in the spring guide 42, and against which one end of each of the at least two compression springs 40, 41 rests, wherein the other end of the at least two compression springs 40, 41 rests against the spring guide 42, and wherein the spring guide slide 43 is captively mounted within the spring guide 42 with the aid of stop points.

The left part of FIG. 27 shows a three-dimensional diagrammatic view of the engaging spring element 9 provided in FIGS. 25 and 26, comprising the spring guide 42, the spring guide slide 43 arranged within the spring guide 42, and the compression springs 40 and 41 arranged within the spring guide 42, wherein the spring guide slide 43 is in its position in the case of an engaged parking lock. The bolting-on points for mounting the spring guide 42 onto the control housing 11 are marked by the reference number 45. The right part of FIG. 27 shows a section through this engaging spring element 9, wherein the position of the spring guide slide 43 represented with the aid of a solid line corresponds to its position in the case of an engaged parking lock (reference character P_ein), whereas the position of the spring guide slide 43 represented with the aid of a dash-dotted line corresponds to its position in the case of a disengaged parking lock (reference character P_aus).

As is apparent in FIG. 26, the spring force of the at least two compression springs 40, 41 acting on the spring guide slide 43 is transmitted to the piston rod 17 of the parking lock piston 12 with the aid of a machine element, which is designed, in the example shown, as a pin 44 captively mounted in the piston rod 17 of the parking lock piston 12.

In the following and with reference to the FIGS. 28A through 28E, a particularly preferred structural embodiment of a parking lock according to example aspects of the invention is described in greater detail, in the case of which, in order to hold down the locking pawl in the disengaged condition of the parking lock, a stop for the locking pawl is provided on the selector disk, which, in the disengaged condition of the parking lock, prevents the locking pawl from touching the parking interlock gear, as an exemplary embodiment of a stop according to FIG. 20.

Figure 28A:
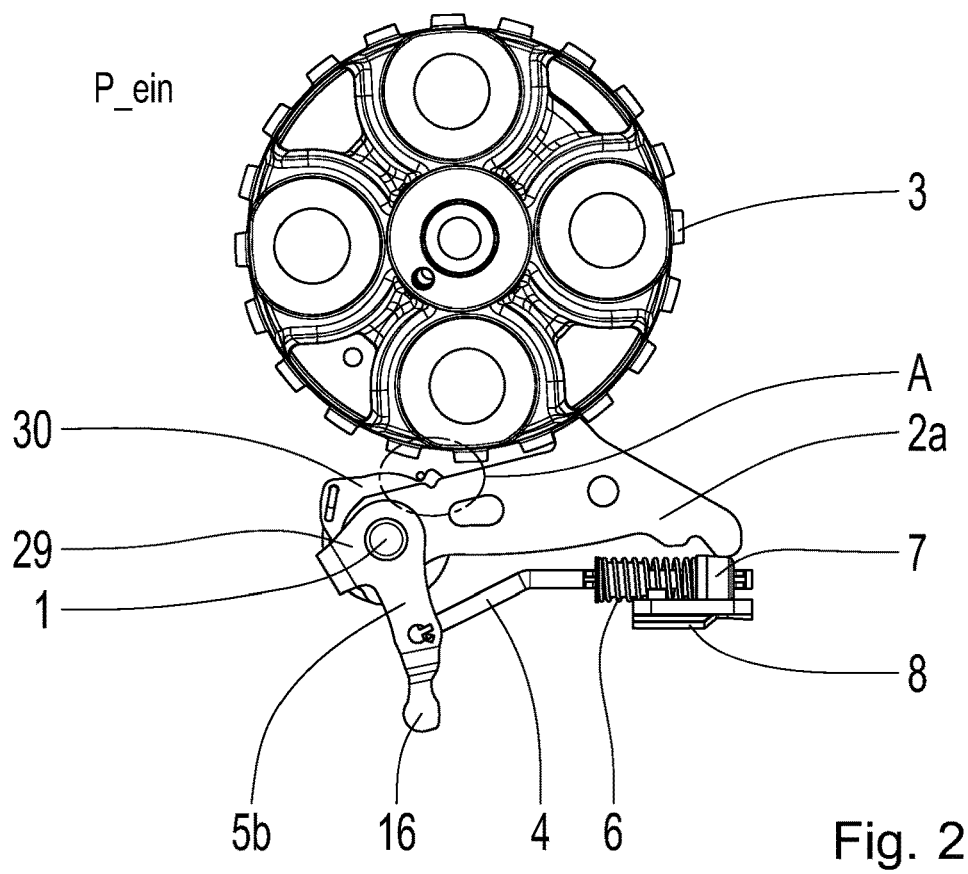
FIG. 28A shows a schematic of an exemplary embodiment of a parking lock according to the invention including a stop according to FIG. 20, in the "parking lock engaged" engagement position.
Figure 28B:
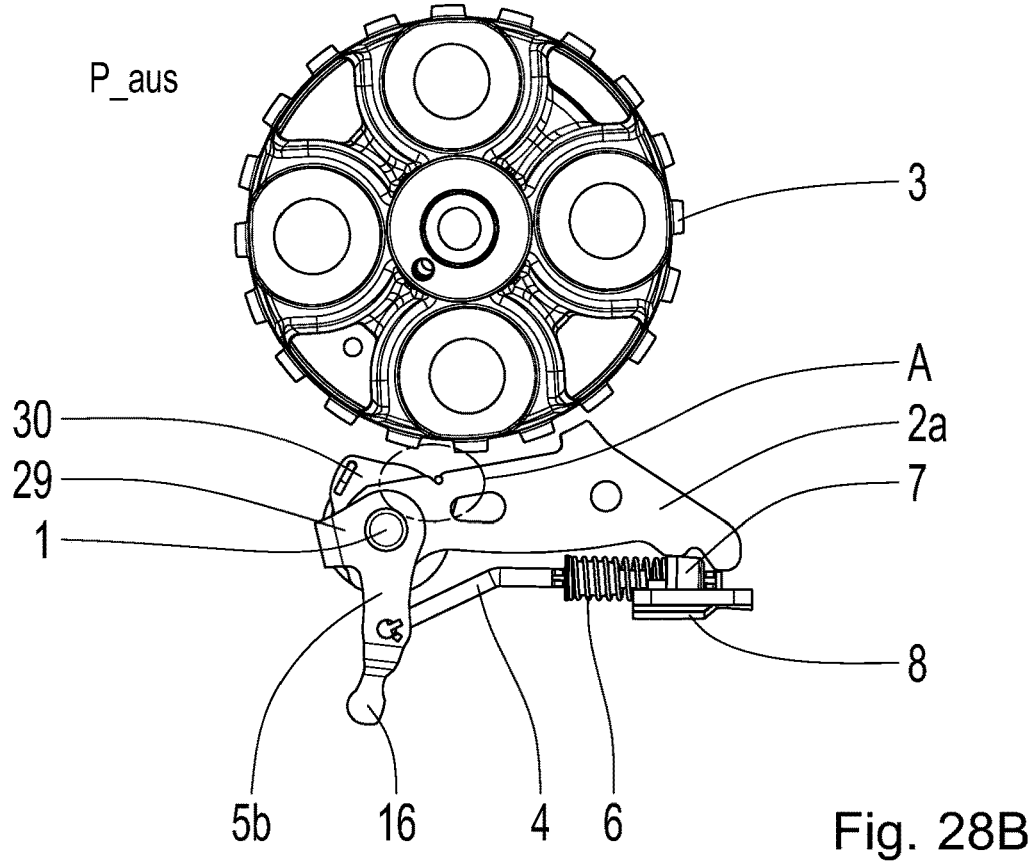
FIG. 28B shows the parking lock according to FIG. 28A in the "parking lock disengaged" engagement position.
Figure 28C:
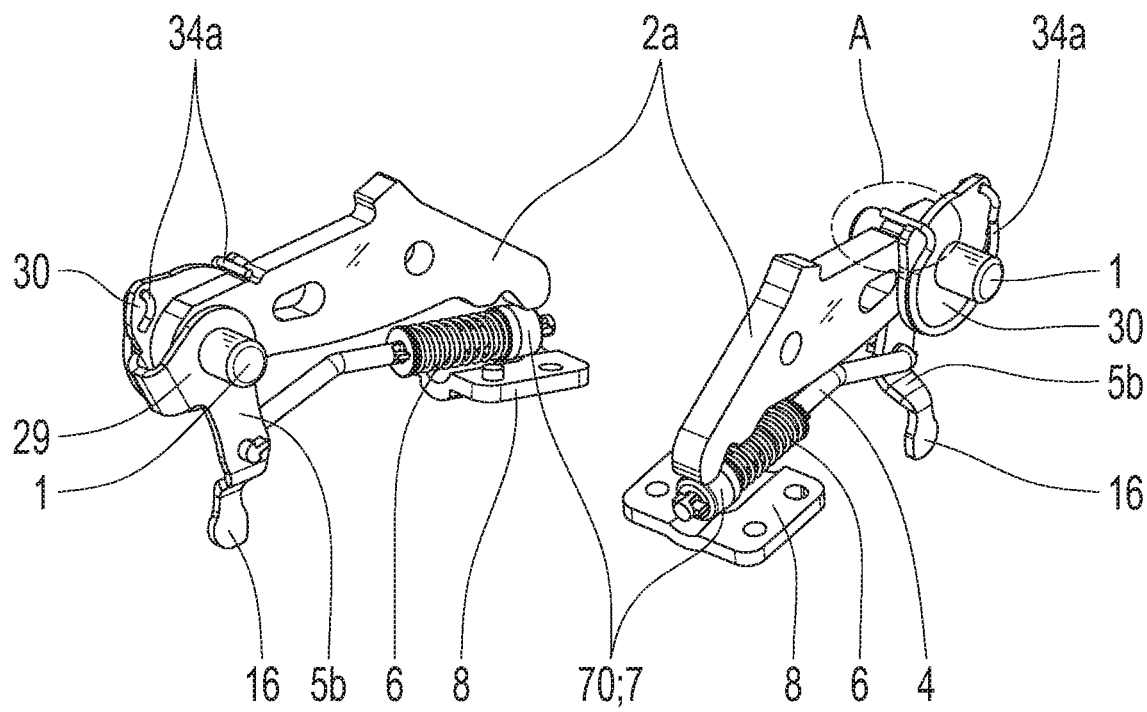
FIG. 28C shows a perspective representation of the parking lock according to FIG. 28A.

The parking lock shown in FIGS. 28A, 28B and 28C includes, in turn, a locking pawl 2a, which is pivotably mounted on a pawl pin 1 and engages into or disengages from a parking interlock gear 3, and an interlocking element 7, which is arranged on a connecting bar 4 to a selector disk 5b, is spring-loaded with the aid of a spring element 6, and is designed as a locking cone 70, which, in the interlocked condition, is clamped between the locking pawl 2a and a guiding plate 8 in order to prevent the locking pawl 2a from being forced out from a tooth space of the parking interlock gear 3. An engaging piece 16 of the selector disk 5b is operatively connected to a hydraulically actuatable parking lock piston, which is not represented here in greater detail, for the sake of simplicity. As proposed already with respect to FIG. 15, the selector disk 5b includes two legs 29, 30, each of which includes a circular bore, wherein these bores are arranged coaxially to each other and are utilized for mounting the selector disk 5b on the pawl pin 1, wherein the locking pawl 2a is mounted between these two legs 29, 30. The stop surface 31 of the selector disk 5b and the corresponding stop surface 32 of the locking pawl 2a are concealed in the representation of the FIGS. 28A through 28C. The spring element provided for holding down the locking pawl 2a in the "parking lock disengaged" engagement position is marked by 34a.

FIG. 28A shows this parking lock in the "parking lock engaged" engagement position, marked by the reference character P_ein. FIG. 28B shows this parking lock in the "parking lock disengaged" engagement position, marked by the reference character P_aus. Finally, FIG. 28C shows this parking lock in a three-dimensional representation.

In the disengaged condition (P_aus) of the parking lock, the locking pawl 2a is held down by the spring element 34a, which is designed here, by way of example, as a cost-effective bending spring formed from spring wire. The distinguishing feature of this spring element 34a is the type of support on the selector disk 5b. The spring element 34a is preloaded on the selector disk 5b in such a way that a free end of the spring element 34a—in this case, the end of the bending spring bent at a right angle and facing the locking cone 70, marked as detail A in FIGS. 28A, 28B, and 28C—comes into contact with the locking pawl 2a in a force-locking manner only if the selector disk 5b, originating from its position in the engaged condition (P_ein) of the parking lock, is turned by a predefined angle in the direction of its position in the disengaged condition (P_aus) of the parking lock. Only for the case in which the free end of the spring element 34a acts on the locking pawl 2a in a force-locking manner, the force of the spring element 34a acting on the locking pawl 2a prevents contact between the locking pawl 2a and the parking interlock gear 3.

Therefore, the effectiveness of the bending spring 34a is possible only when the parking lock is disengaged, without the bending spring 34a holding down the locking pawl 2a when the parking lock is engaged. If the selector disk 5b turns into the P_ein position, the bending spring 34a releases the locking pawl 2a and the bending spring 34a rotates along with or with the aid of the selector disk 5b away from its stop point on the locking pawl 2a, so that the ratchet tooth of the locking pawl 2a can now drop into a tooth space of the parking interlock gear 3 without a counter force of the bending spring 34a.

Figure 28D:
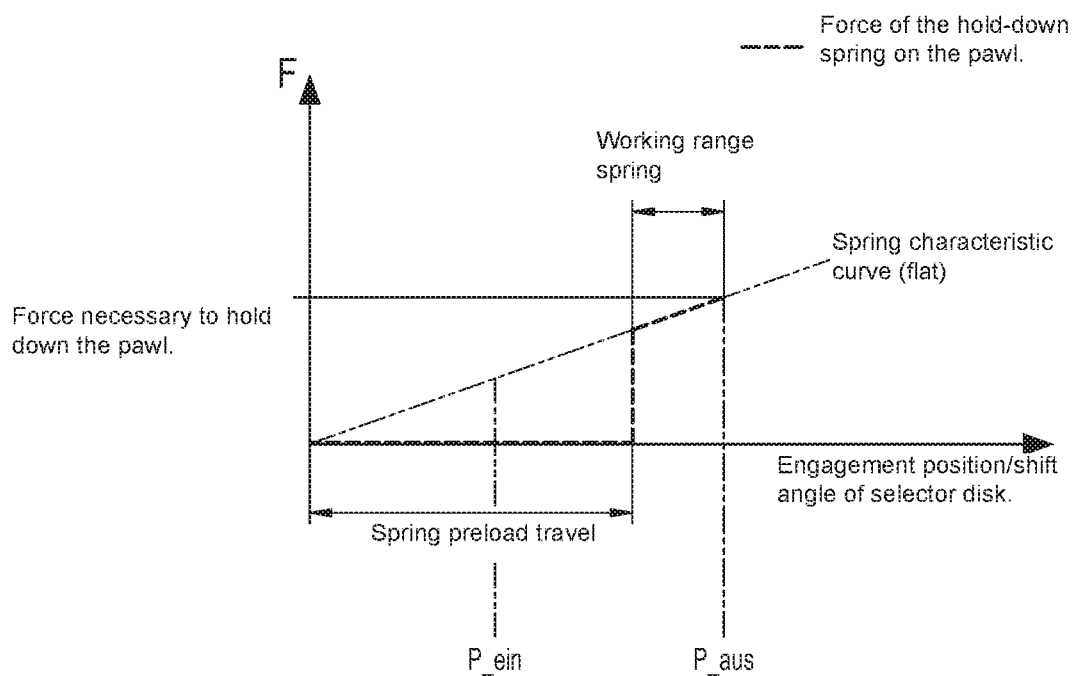
FIG. 28D shows a force diagram for a spring element provided for holding down the locking pawl in the "parking lock disengaged" engagement position, which acts only in the "parking lock disengaged" engagement position.

Due to the fact that the bending spring 34a rests against the selector disk 5b, the selector disk 5b is geometrically configurable in such a way that the selector disk 5b includes two mounting recesses for the bending spring 34a, in which the bending spring 34a is captively mounted in an advantageous way. A further essential advantage of such an embodiment is that the position of these two mounting recesses relative to one another results in extensive constructive scope for the force of the bending spring 34a effectively acting on the locking pawl 2a. Therefore, the working range of the bending spring 34 is adaptable to the particular application, within wide limits, despite a small rotation angle of the selector disk 5b. This type of the preload of the bending spring 34a on the selector disk 5b also allows for a flat spring characteristic curve, with the advantage of a high hold-down force in combination with only slight locking pawl travel. In order to illustrate this situation, FIG. 28D shows a self-explanatory diagram including exemplary force characteristics for a spring element 34a provided for holding down the locking pawl 2a in the "parking lock disengaged" engagement position, which acts only in the "parking lock disengaged" engagement position.

Figure 28E:
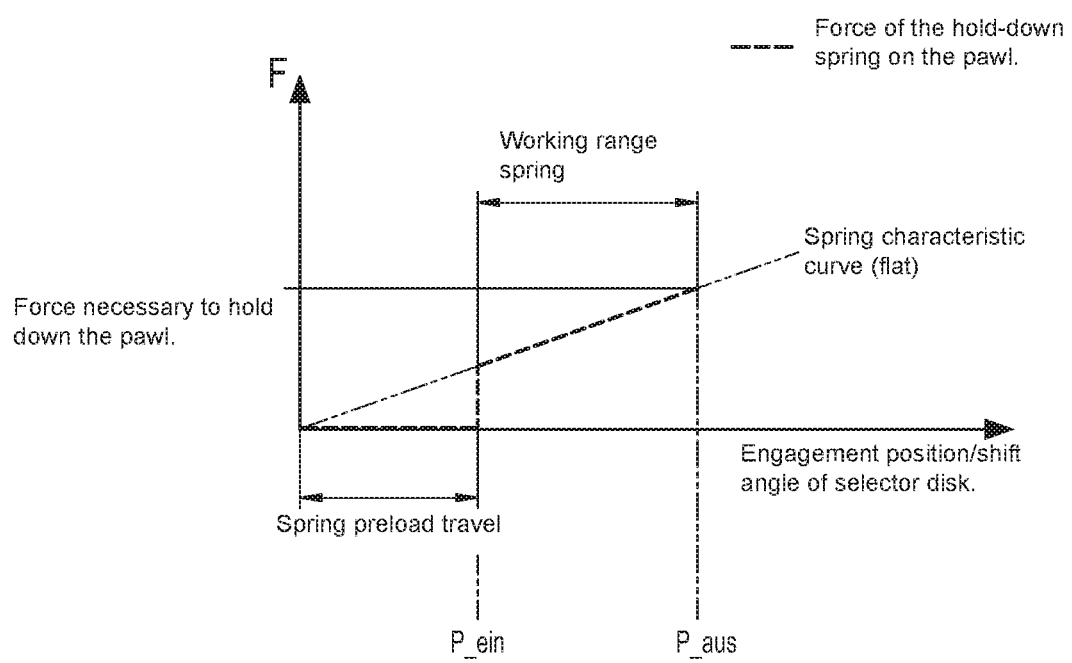
FIG. 28E shows a force diagram for a spring element provided for holding down the locking pawl in the "parking lock disengaged" engagement position, which acts in the "parking lock engaged" engagement position as well as in the "parking lock disengaged" engagement position.

Alternatively to the exemplary embodiment of a parking lock according to the invention, described with reference to FIGS. 28A, 28B, 28C, and 28E, it can also be provided that the preload of the spring element 34a on the selector disk 5b is structurally implemented in such a way that a free end of the spring element 34a is already in contact with the locking pawl 2a in a force-locking manner if the selector disk 5b is in its position in the engaged condition (P_ein) of the parking lock, wherein, for the case in which the selector disk 5b, originating from its position in the engaged condition (P_ein) of the parking lock, is turned in the direction of its position in the disengaged condition (P_aus) of the parking lock, the force of the spring element 34a acting on the locking pawl 2a is increased in such a way that contact between the locking pawl 2a and the parking interlock gear 3 is reliably prevented. FIG. 28E shows a self-explanatory diagram including exemplary force characteristics for such a spring element 34a provided for holding down the locking pawl 2a in the "parking lock disengaged" engagement position, which acts in the "parking lock engaged" engagement position as well as in the "parking lock disengaged" engagement position.

Figure 29:
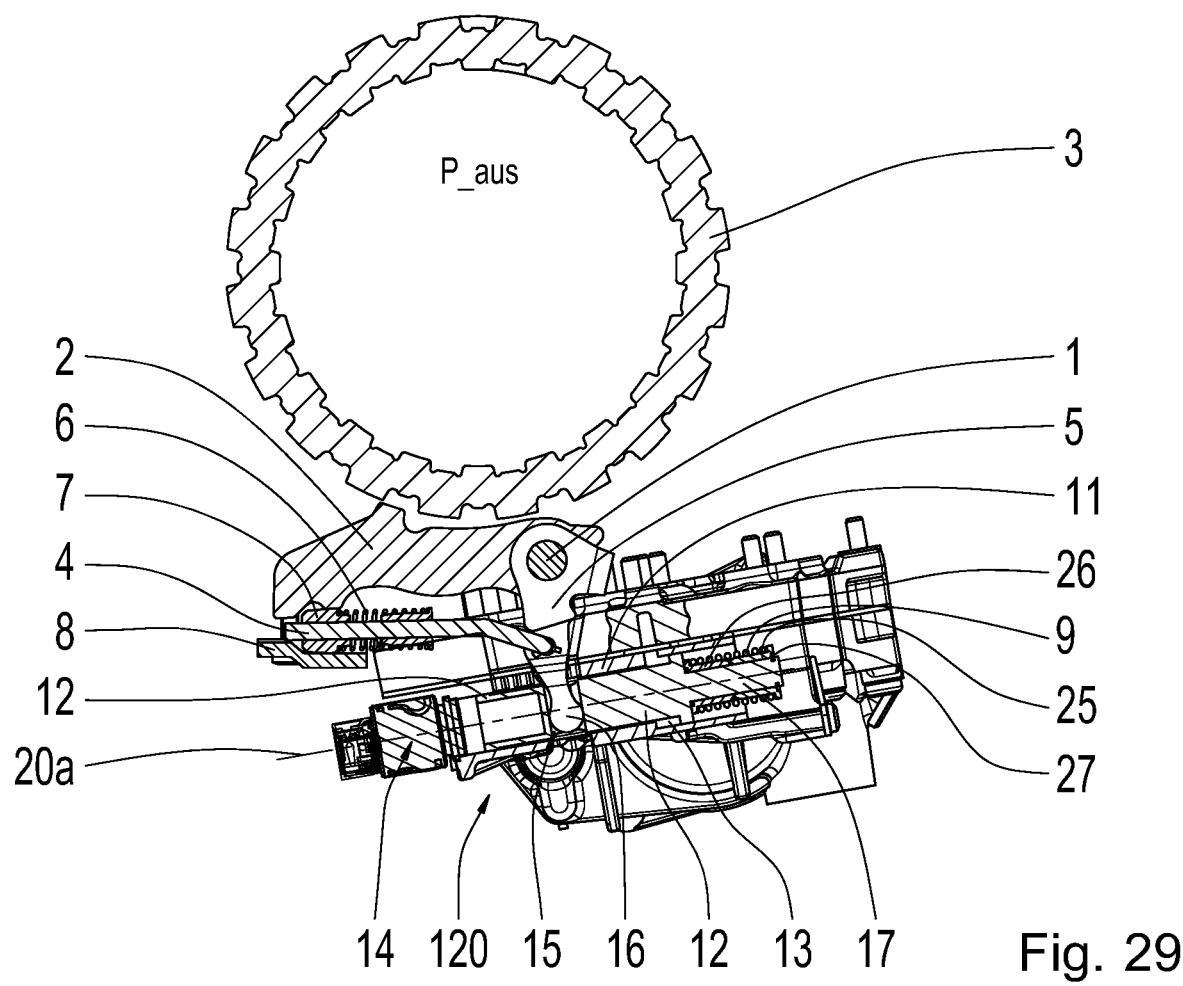
FIG. 29 shows a schematic of a fifth exemplary embodiment of a parking lock according to example aspects of the invention in the "parking lock disengaged" engagement position.

Returning to the exemplary embodiments represented, in particular, in the FIGS. 2A, 2B, 2C and 12A, 12B, 12C, in which the electromagnetically actuatable detent device 14 provided for the situational mechanical fixation of the parking lock piston 12 is always arranged on the side of the parking lock piston 14 facing away from the interlocking element 7 actuated by the actuator piston 12, reference is made at this point to the exemplary character of this spatial arrangement of the detent device 14. As necessary, a person skilled in the art will also provide another spatial arrangement of the detent device 14. As an example of such an alternative, a fifth exemplary embodiment of a parking lock according to the invention is provided in FIG. 29, which is derived from the fourth exemplary embodiment of a parking lock according to the invention represented in the FIGS. 12A, 12B, and 12C. The essentially self-explanatory FIG. 29 shows the parking lock mechanism in the case of a disengaged parking lock, marked by the reference character P_aus. It is readily apparent, in FIG. 29, that the parking lock piston 12 is designed as a mirror image as compared to the FIGS. 12A, 12B, and 12C, so that, viewed spatially, the pressure chamber 13 of the parking lock piston 12, to which pressure is to be supplied during disengagement of the parking lock, as well as the engaging spring element 9 tensioned between the control housing 11 and the parking lock piston 12 are now arranged on the side of the parking lock piston 12, which faces away from the interlocking element 7 actuated by the actuator piston 12. Consequently, the detent device 14 is now arranged close to the interlocking element 7. In this design, the detent device 14, as viewed in the direction of the parking lock piston longitudinal axis 20, is therefore arranged on the side of the force-transmitting recess 15 of the actuator piston 12 facing the interlocking element 7, whereas the pressure chamber 13 and the engaging spring element 9 are arranged on the side of the force-transmitting recess 15 of the actuator piston 12 facing away from the interlocking element 7.

Figure 30:
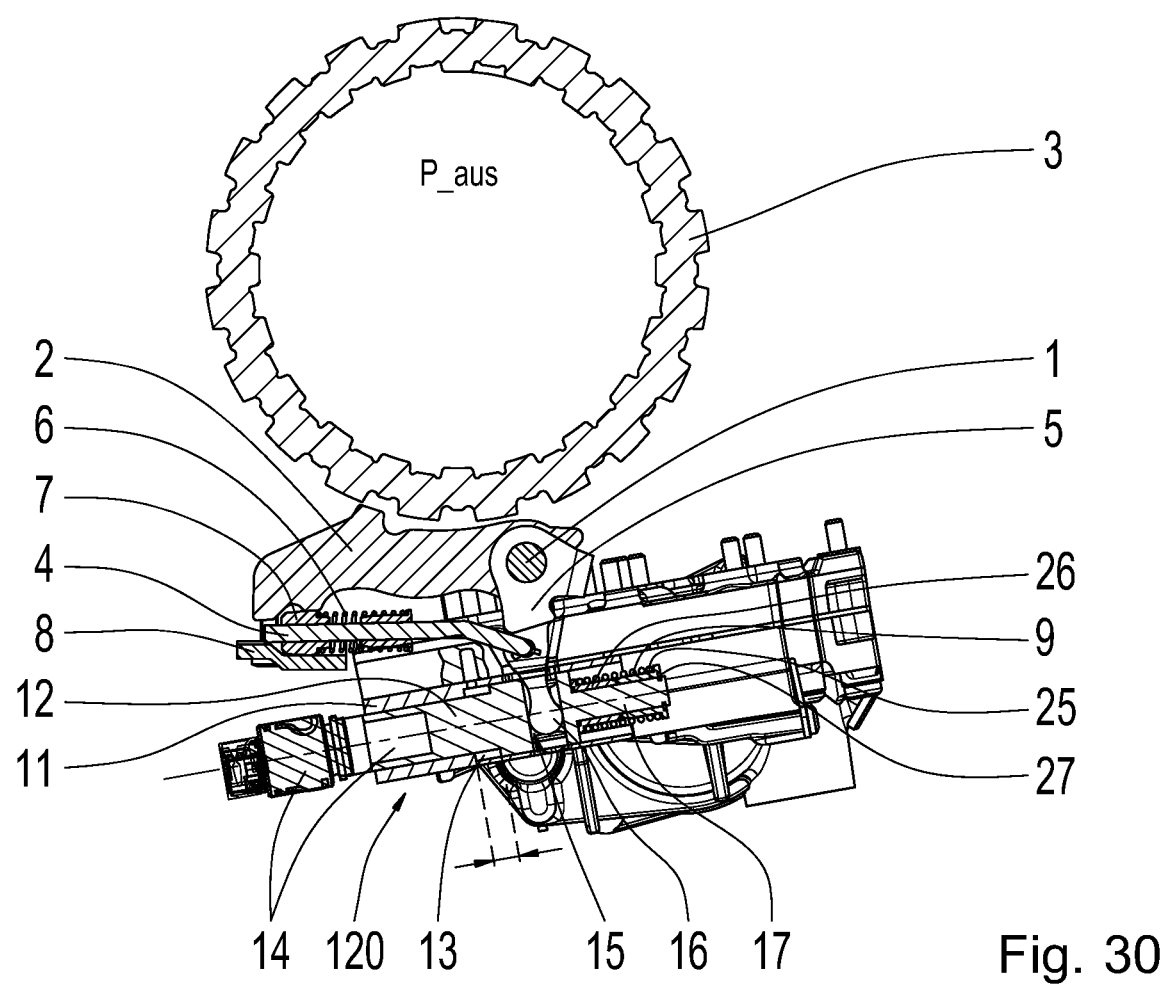
FIG. 30 shows a schematic of a sixth exemplary embodiment of a parking lock according to example aspects of the invention in the "parking lock disengaged" engagement position.

In an alternative to the variant represented in FIG. 29, in which the design of the actuator piston 12 has been modified with respect to FIG. 29, it can also be provided that the detent device 14 as well as the pressure chamber 13 of the actuator piston 12 can be arranged close to the interlocking element 7. Such an alternative is the object of FIG. 30, as a sixth exemplary embodiment of a parking lock according to the invention. In FIG. 30, in deviation from FIG. 29, the detent device 14 as well as the pressure chamber 13, as viewed in the direction of the parking lock piston longitudinal axis 20, are arranged on the side of the force-transmitting recess 15 of the actuator piston 12 facing the interlocking element 7, whereas the engaging spring element 9, as in FIG. 29, is arranged on the side of the force-transmitting recess 15 of the actuator piston 12 facing away from the interlocking element 7.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 pawl pin
2; 2a locking pawl
3 parking interlock gear
4 connecting bar
5; 5a; 5b selector disk
6 spring element
7 interlocking element
8 guiding plate
9 engaging spring element
10 pawl pin longitudinal axis; locking pawl pivot axis; selector-lever axis of rotation
11 control housing
12 parking lock piston
13 pressure chamber of the parking lock piston
14 detent device
15 recess
16; 16a engaging piece
17; 17a piston rod of the parking lock piston
18 groove
19; 19a pin
20; 20a parking lock piston longitudinal axis
21 lead-in chamfer
22 lead-in chamfer
23 detent unit
24 detent hook
25 sleeve
26 sleeve
27 snap ring-type retainer
28 circular groove
29 leg
30 leg
31 stop surface of the selector disk
32 stop surface of the locking pawl
33 gap
34; 34a spring element
35 leaf spring
36 bolted connection point
37 fork-shaped contour
38 guiding plate bolted connection
39 pin
40 compression spring
41 compression spring
42 spring guide
43 spring guide slide
44 pin
45 bolting-on points
70 locking cone
71 lifting area of the locking cone
72 interlock area of the locking cone
73 guide area of the locking cone
74 impact contour of the locking pawl
75 locking pawl section close to the interlock area 76 locking pawl section close to the connecting bar
100 Perpendicular to the parking lock piston longitudinal axis including point of intersection through the selector-disk axis of rotation
120 parking lock actuator
121 electric servo-drive
122 electric motor of the electric servo-drive
123 spindle drive of the electric servo-drive
160 shift angle of the selector disk
161 contour of the engaging piece; operative connection between engaging piece and parking lock piston during the disengagement of the parking lock
162 circle or circular segment, effective during the disengagement of the parking lock
163 center of circle; point of intersection of the perpendicular through the parking lock piston longitudinal axis
164 point of contact during the disengagement of the parking lock
165 contour of the engaging piece; operative connection between engaging piece and parking lock piston during the engagement of the parking lock
166 radius around the selector-disk axis of rotation
167 circle or circular segment, effective during the engagement of the parking lock
168 point of contact during the engagement of the parking lock
A detail
P_aus disengaged condition of the parking lock
P_ein engaged condition of the parking lock

The invention claimed is:

1. A parking lock for an automatic transmission in a motor vehicle, comprising:
a locking pawl (2; 2a) pivotably mounted on a pawl pin (1) and engageable with a parking interlock gear (3) connected to an output shaft of the automatic transmission;
an interlocking element (7) arranged on a connecting bar (4) to a selector disk (5; 5a; 5b), the interlocking element (7) spring-loaded with a spring element (6), the interlocking element (7) clamped between the locking pawl (2; 2a) and a guiding plate (8) in order to prevent the locking pawl (2; 2a) from being forced out from a tooth space of the parking interlock gear (3) in an engaged condition (P_ein) of the parking lock,
wherein an end of the connecting bar (4) facing away from the interlocking element (7) is articulatedly connected to the selector disk (5; 5a; 5b),
wherein the selector disk (5; 5a; 5b) is operatively connected to a parking lock actuator (120) such that the parking lock is disengageable with an actuation force of the parking lock actuator (120) counter to a spring force of an engaging spring element (9), and the parking lock is engageable with the spring force of the engaging spring element (9),
wherein the connecting bar (4) is arranged below the locking pawl (2; 2a) such that the connecting bar (4) is parallel to the locking pawl (2; 2a) and also perpendicular to the pawl pin (1),
wherein the selector disk (5; 5a; 5b) is rotatably mounted on the pawl pin (1),
wherein the parking lock actuator (120) is arranged parallel to the connecting bar (4) below the connecting bar (4) such that the parking lock actuator (120), the locking pawl (2; 2a), and the connecting bar (4) are arranged in a common plane.

2. The parking lock of claim 1, wherein the parking lock actuator (120) comprises a hydraulically actuatable parking lock piston (12) that is axially displaceable in a control housing (11) and is operatively connected to an engaging piece (16) of the selector disk (5; 5a; 5b).

3. The parking lock of claim 2, wherein the control housing (11) and the parking lock piston (12) each comprise a recess (15) into which the engaging piece (16) extends in order to establish an operative connection between the selector disk (5; 5a; 5b) and the parking lock piston (12), and the engaging piece (16) is rotationally fixed to the selector disk (5; 5a; 5b) or integrally formed with the selector disk (5; 5a; 5b).

4. The parking lock of claim 3, wherein the engaging piece (16) comprises two geometrically different contours (161, 165) in an actuation area, a first contour (161) of the two geometrically different contours (161, 165) forms the operative connection between the selector disk (5) and the parking lock piston (12) during the disengagement of the parking lock, and a second contour (165) of the two geometrically different contours (161, 165) forms the operative connection between the selector disk (5) and the parking lock piston (12) during the engagement of the parking lock.

5. The parking lock of claim 4, wherein the first contour (161) of the engaging piece (16) is shaped such that a lever arm force of the selector disk (5) applied during disengagement of the parking lock remains constant during the disengagement of the parking lock for every shift angle (160) of the selector disk (5) possible in an operating range.

6. The parking lock of claim 4, wherein the first contour (161) of the engaging piece (16) is shaped such that a point of contact (164) at which the first contour (161) touches the parking lock piston (12) at a shift angle (160) lies on a longitudinal axis (20) of the parking lock piston (12) for every shift angle (160) of the selector disk (5) possible in an operating range.

7. The parking lock of claim 4, wherein the second contour (165) of the engaging piece (16) is shaped such that the engaging piece (16) rolls against the parking lock piston (12a) during engagement of the parking lock at all points of contact (168) where the second contour (165) touches the parking lock piston (12a) for every shift angle (160) of the selector disk (5) in an operating range.

8. The parking lock of claim 4, wherein the engaging piece (16) comprises a groove (18) in an actuation area, the groove (18) engages with a pin (19) connected to the parking lock piston (12), the groove (18) is straight or reniform, and the pin (19) is arranged perpendicular to a longitudinal axis (20) of the parking lock piston (12).

9. The parking lock of claim 8, wherein the groove (18) is reniform such that an axial extension of the interlocking element (7) is increased relative to when the groove (18) is straight.

10. The parking lock of claim 8, wherein the groove (18) is reniform such that no transverse force is exerted on the parking lock piston (12) when the parking lock is engaged and when the parking lock is disengaged.

11. The parking lock of claim 3, wherein an end of the engaging piece (16) facing the parking lock piston (12) comprises lead-in chamfers (21), and the parking lock piston (12a) also comprises lead-in chamfers (22) at the recess (15).

12. The parking lock of claim 2, wherein the engaging spring element (9) is a compression spring, and the compression spring is at least partially surrounds and is concentric with a piston rod (17) of the parking lock piston (12).

13. The parking lock of claim 12, wherein:
the compression spring (9) is guided on a plurality of sleeves (25, 26);

a first sleeve (26) of the plurality of sleeves (25, 26) is provided on an end of the compression spring (9) facing the control housing (11) and rests against the control housing (11);

a second sleeve (25) of the plurality of sleeves (25, 26) is provided on another end of the compression spring (9) facing away from the control housing (11) and is held by a snap ring retainer (27); and the snap ring retainer (27) is radially secured by the second sleeve (25).

14. The parking lock of claim 12, wherein:

a circular groove (28) on the control housing (11) extends around a central axis of the piston rod (17);

an end of the compression spring (9) facing the control housing (11) lies within the circular groove (28);

another end of the compression spring (9) facing away from the control housing (11) is guided on a sleeve (25) and is held by a snap ring retainer (27); and the snap ring retainer (27) is radially secured by the sleeve (25).

15. The parking lock of claim 2, wherein the engaging spring element (9) is a leaf spring (35), a first end of the leaf spring (35) is bolted to one or both of a transmission housing and the guiding plate (8), and a second end of the leaf spring (35) engages a piston rod (17) of the parking lock piston (12) via a fork-shaped contour (37) of the leaf spring (35) and a pin (38) mounted on the piston rod (17).

16. The parking lock of claim 2, wherein:

the engaging spring element (9) comprises at least two parallel compression springs (40, 41);

the at least two parallel compression springs (40, 41) are arranged in parallel to a piston rod (17) of the parking lock piston (12a) and are positioned within in a spring guide (42) connected to the control housing (11);

a spring guide slide (43) is configured to permit a displacement travel of the at least two compression springs (40, 41);

the spring guide slide (43) is operatively connected to the piston rod (17) of the parking lock piston (12) and is displaceably arranged in the spring guide (42);

a first end of each of the at least two compression springs (40, 41) rests against the spring guide slide (43);

a second end of each of the at least two compression springs (40, 41) rests against the spring guide (42);

the spring guide slide (43) is mounted within the spring guide (42) with stop points; and a spring force of the at least two compression springs (40, 41) acting on the spring guide slide (43) is transmitted to the piston rod (17) of the parking lock piston (12) via a machine element.

17. The parking lock of claim 1, wherein the parking lock actuator (120) is an electric servo-drive (121) operatively connected to the selector disk (5).

18. The parking lock of claim 1, wherein the engaging spring element (9) is a torsion spring, and coils of the torsion spring are arranged around the pawl pin (1).

19. The parking lock of claim 1, wherein the selector disk (5) comprises two legs (29, 30), each of the two legs (29, 30) comprises a circular bore, the circular bores of the two legs (29, 30) are arranged coaxially to each other and are configured to mount the selector disk (5; 5b) on the pawl pin (1), and the locking pawl (2; 2a) is mounted between the two legs (29, 30).

20. The parking lock of claim 1, wherein a stop for the locking pawl (2a) is provided on the selector disk (5b) to hold the locking pawl (2a) in a disengaged condition (P_aus) of the parking lock, and the stop for the locking pawl (2a) prevents the locking pawl (2a) from touching the parking interlock gear (3) in the disengaged condition (P_aus) of the parking lock.

21. The parking lock of claim 20, wherein a stop surface (31) is the stop on the selector disk (5b), the stop surface (31) cooperates with a corresponding stop surface (32) of the locking pawl (2a), and a gap is not provided between the stop surface (31) of the selector disk (5b) and the corresponding stop surface (32) of the locking pawl (2a) in the disengaged condition (P_aus) of the parking lock.

22. The parking lock of claim 20, wherein a stop surface (31) is the stop on the selector disk (5b), the stop surface (31) cooperates with a corresponding stop surface (32) of the locking pawl (2a), an additional spring element (34) is arranged on one of the stop surface (31) or the corresponding stop surface (32), and the additional spring element (34) is configured to assist the engaging spring element (9) during the engagement of the parking lock.

23. The parking lock of claim 20, wherein a stop surface (31) is the stop on the selector disk (5b), the stop surface (31) cooperates with a corresponding stop surface (32) of the locking pawl (2a), an additional spring element (34) is arranged on both the stop surface (31) and the corresponding stop surface (32), and the additional spring element (34) is configured to assist the engaging spring element (9) during the engagement of the parking lock.

24. The parking lock of claim 20, wherein a stop surface (31) is the stop on the selector disk (5b), the stop surface (31) cooperates with a corresponding stop surface (32) of the locking pawl (2a), and a gap (33) is provided between the stop surface (31) of the selector disk (5b) and the corresponding stop surface (32) of the locking pawl (2a) in the disengaged condition (P_aus) of the parking lock.

25. The parking lock of claim 1, further comprising an additional spring element (34a) configured to prevent the locking pawl (2a) from touching the parking interlock gear (3) in a disengaged condition (P_aus) of the parking lock.

26. The parking lock of claim 25, wherein the additional spring element (34a) is configured to assist the engaging spring element (9) during the engagement of the parking lock.

27. The parking lock of claim 25, wherein the additional spring element (34a) is preloaded on the selector disk (5b) such that a free end of the additional spring element (34a) contacts the locking pawl (2a) in a force-locking manner only when the selector disk (5b), originating from a position of the selector disk (5b) in the engaged condition (P_ein) of the parking lock, turns by a predefined angle towards a position of the selector disk (5b) in the disengaged condition (P_aus) of the parking lock, and a force of the additional spring element (34a) acting on the locking pawl (2a) preventing contact between the locking pawl (2a) and the parking interlock gear (3) when the free end of the additional spring element (34a) acts on the locking pawl (2a) in the force-locking manner.

28. The parking lock of claim 25, wherein:

the additional spring element (34a) is preloaded on the selector disk (5b) such that a free end of the additional spring element (34a) contacts the locking pawl (2a) in a force-locking manner when the selector disk (5b) is in a position of the selector disk (5b) corresponding to the engaged condition (P_ein) of the parking lock, and when the selector disk (5b), originating from the position of the selector disk (5b) in the engaged condition (P_ein) of the parking lock, turns towards a position of the selector disk (5b) in the disengaged condition (P_aus) of the parking lock, a force of the additional spring element (34a) acting on the locking pawl (2a) increases to prevent contact between the locking pawl (2a) and the parking interlock gear (3).

29. The parking lock of claim 1, wherein the locking pawl (2a) is shaped such that the locking pawl (2a) rests against the interlocking element (7) in a force-locking manner in the engaged condition (P_ein) of the parking lock and in a disengaged condition (P_aus) of the parking lock.

30. The parking lock of claim 29, wherein the locking pawl (2a) comprises a first functional surface and a second functional surface, the first functional surface clamps the interlocking element (7) between the locking pawl (2a) and the guiding plate (8) in the engaged condition (P_ein) of the parking lock, and the second functional surface rests against a corresponding surface of the interlocking element (7) in the disengaged condition (P_aus) of the parking lock.

31. A method for installing an engaging piece (16) of a selector disk (5) into a parking lock piston (12a), wherein an engaging spring element (9) is a compression spring that at least partially surrounds and is concentric with a piston rod (17) of the parking lock piston (12), the method comprising:
    pushing the parking lock piston (12) into a piston bore of a control housing (11);
    thereafter, inserting an electrically actuatable detent unit (23) into the piston bore, wherein the detent unit (23) comprises detent elements for a parking lock engaged end position and a parking lock disengaged end position of the parking lock piston (12), the detent elements blocking the parking lock piston (12) from being pushed into the parking lock engaged end position in a non-energized condition of the detent unit (23);
    thereafter, installing the compression spring (9) onto the piston rod (17);
    thereafter, bolting the control housing (11) onto a transmission housing or onto an electro-hydraulic transmission control unit, the parking lock piston (12) is in the parking lock engaged end position before the bolting of the control housing (11), the selector disk (5) is in a parking lock disengaged position of the selector disk (5) before the bolting of the control housing (11);
    thereafter, energizing the detent unit (23) so that the compression spring (9) on the piston rod (17) is overcompressed to an extent that the piston rod (17) reaches a parking lock disengaged position of the piston rod (17), wherein, the energization of the detent unit (23) is interrupted when the parking lock piston (12) reaches the parking lock disengaged end position so that the detent unit (23) drops into a parking lock disengaged position of the detent unit (23), the engaging piece (16) and a recess (15) of the parking lock piston (12) are arranged one above the other in the parking lock disengaged end position of the parking lock piston (12); and
    thereafter, guiding the engaging piece (16) onto a pin (19).

* * * * *